Figure 1:
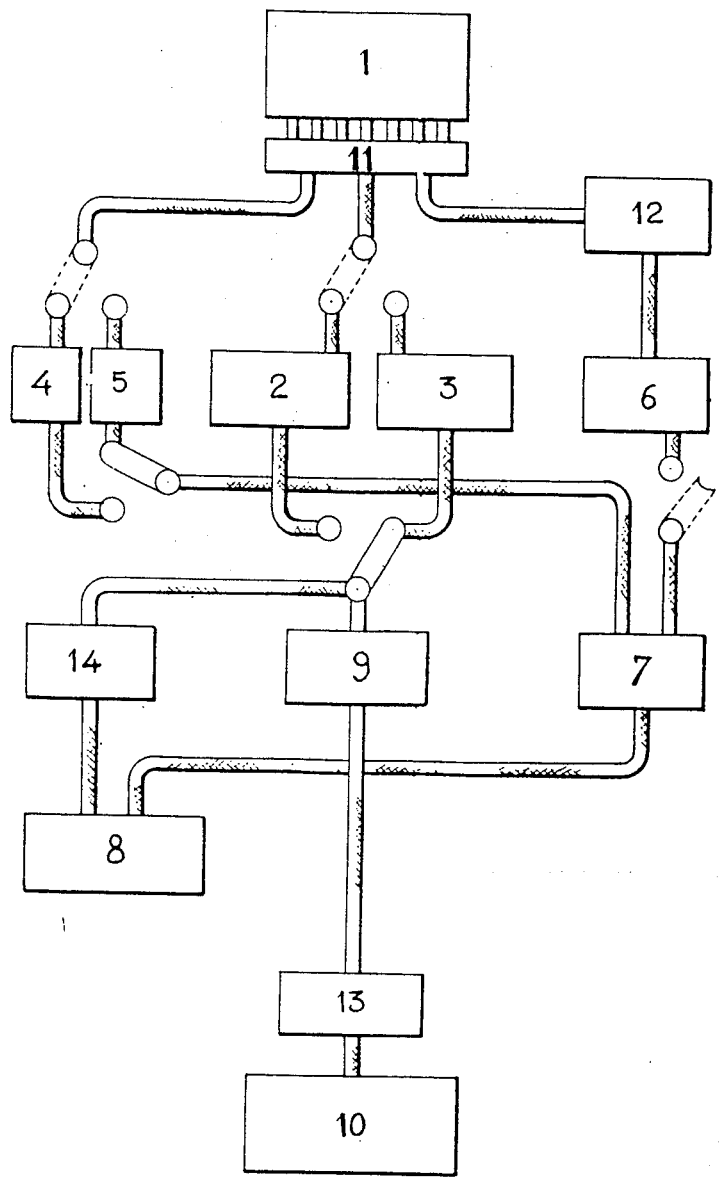

April 30, 1957 R. HIGONNET ET AL 2,790,362
PHOTO COMPOSING MACHINE
Filed Aug. 23, 1947 30 Sheets-Sheet 3

INVENTORS.
Rene Higonnet & Louis Moyroud.
BY Kenway & Witter

INVENTORS.
Rene Higonnet & Louis Moyroud.
BY
Kenway & Witter
Attys.

April 30, 1957 R. HIGONNET ET AL 2,790,362
PHOTO COMPOSING MACHINE
Filed Aug. 23, 1947 30 Sheets-Sheet 5

INVENTORS.
Rene Higonnet & Louis Moyroud
BY
Hunway & Wilter
Attys.

April 30, 1957   R. HIGONNET ET AL   2,790,362
PHOTO COMPOSING MACHINE

Filed Aug. 23, 1947   30 Sheets-Sheet 6

INVENTORS.
René Higonnet & Louis Moyroud
BY
Kenway & Witter
Attys.

April 30, 1957 R. HIGONNET ET AL 2,790,362
PHOTO COMPOSING MACHINE
Filed Aug. 23, 1947 30 Sheets-Sheet 7

INVENTORS.
Rene Higonnet & Louis Moyroud.
BY Kenway & Witter
Attys.

April 30, 1957  R. HIGONNET ET AL  2,790,362
PHOTO COMPOSING MACHINE
Filed Aug. 23, 1947  30 Sheets-Sheet 13

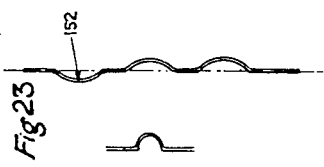
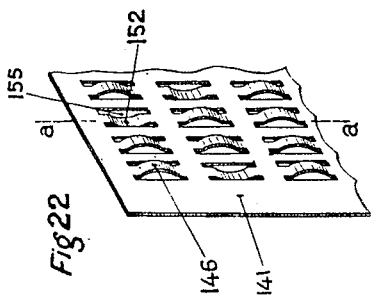
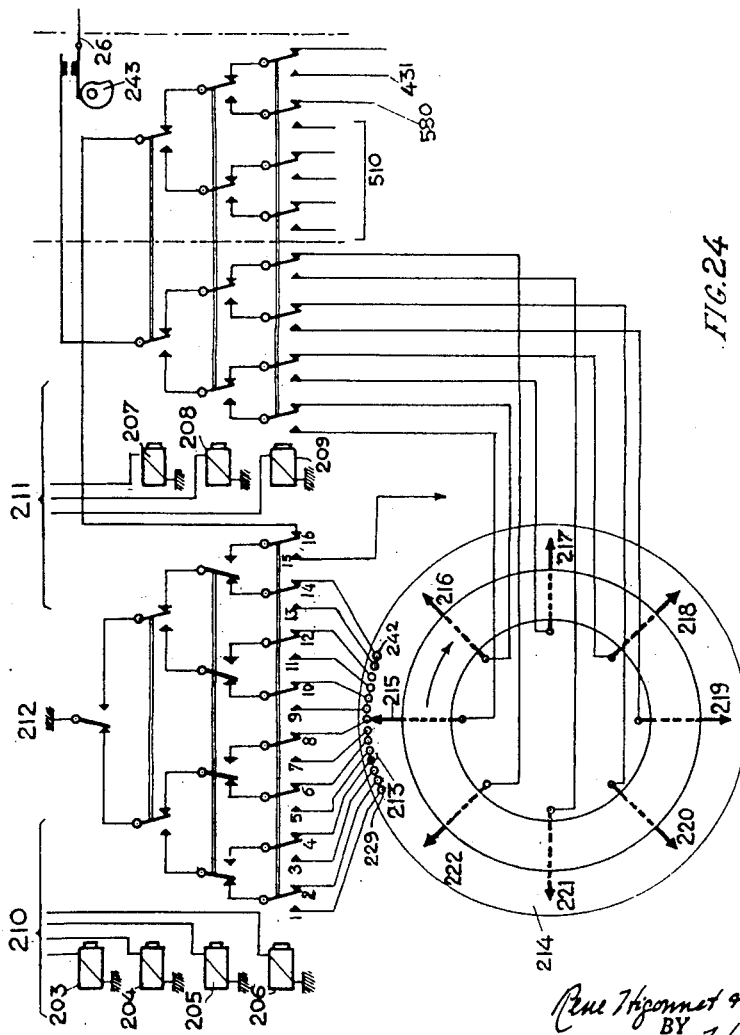

INVENTORS.
Rene Higonnet & Louis Moyroud.
BY Kenway & Witter.
Attys.

April 30, 1957　　R. HIGONNET ET AL　　2,790,362
PHOTO COMPOSING MACHINE
Filed Aug. 23, 1947　　30 Sheets-Sheet 16

INVENTORS.
Rue Higonnet & Louis Moyroud.
BY Kenway & Witter
Attys.

April 30, 1957  R. HIGONNET ET AL  2,790,362
PHOTO COMPOSING MACHINE
Filed Aug. 23, 1947  30 Sheets-Sheet 18
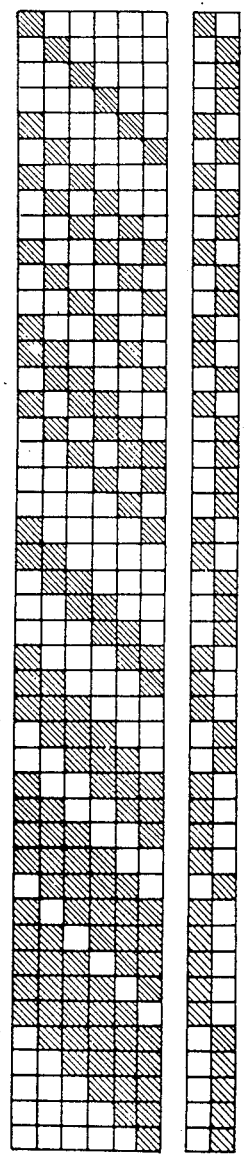
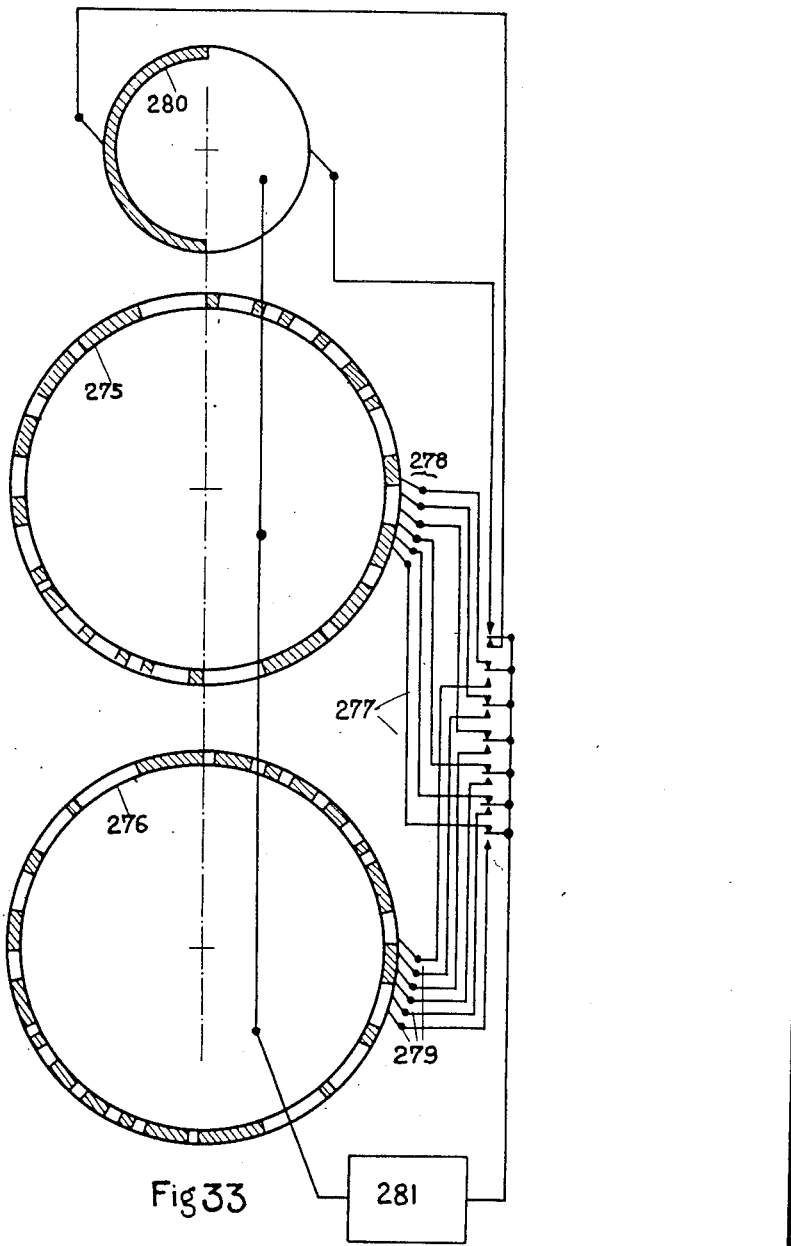
Fig 35  Fig 34  Fig 33
INVENTORS
Rene Higonnet & Louis Moyroud.
BY Kenway & Witter
Attys April 30, 1957 R. HIGONNET ET AL 2,790,362
PHOTO COMPOSING MACHINE
Filed Aug. 23, 1947 30 Sheets-Sheet 19
Fig 43.
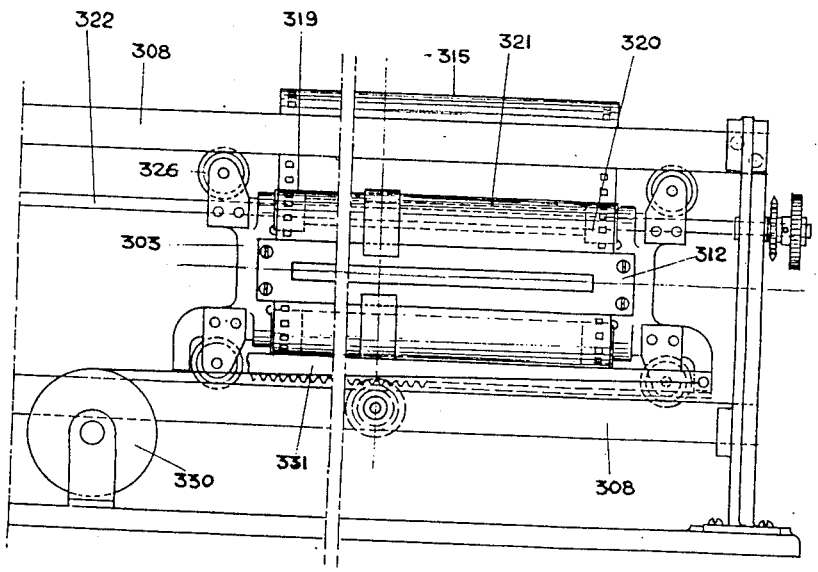
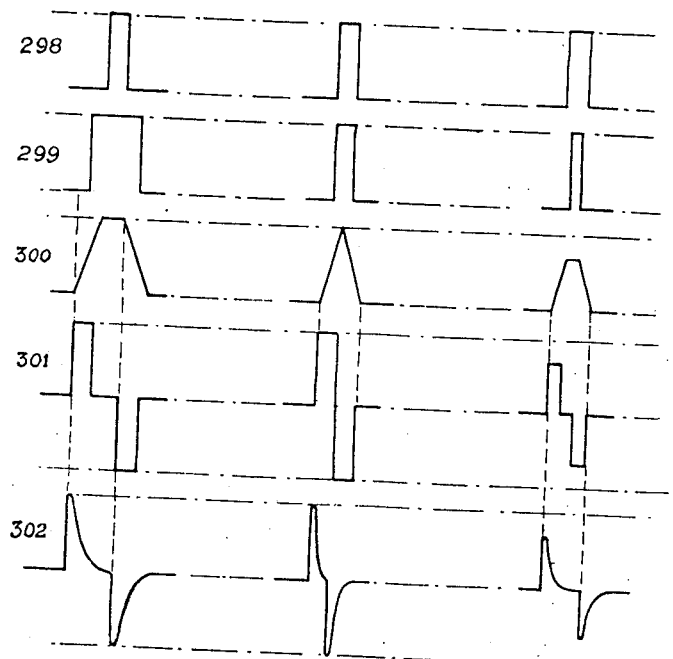
FIG. 37
INVENTORS.
Rene Higonnet & Louis Moyroud.
BY
ATTYS.

INVENTORS.
René Higonnet & Louis Moyroud.
BY Kenway & Witter
Atty.

April 30, 1957 R. HIGONNET ET AL 2,790,362
PHOTO COMPOSING MACHINE
Filed Aug. 23, 1947 30 Sheets-Sheet 29
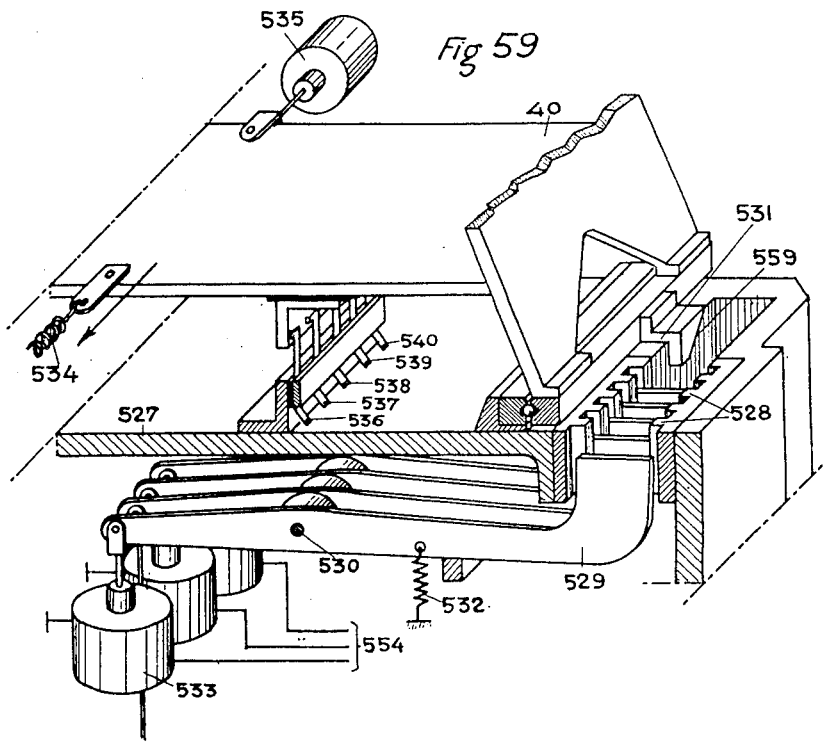
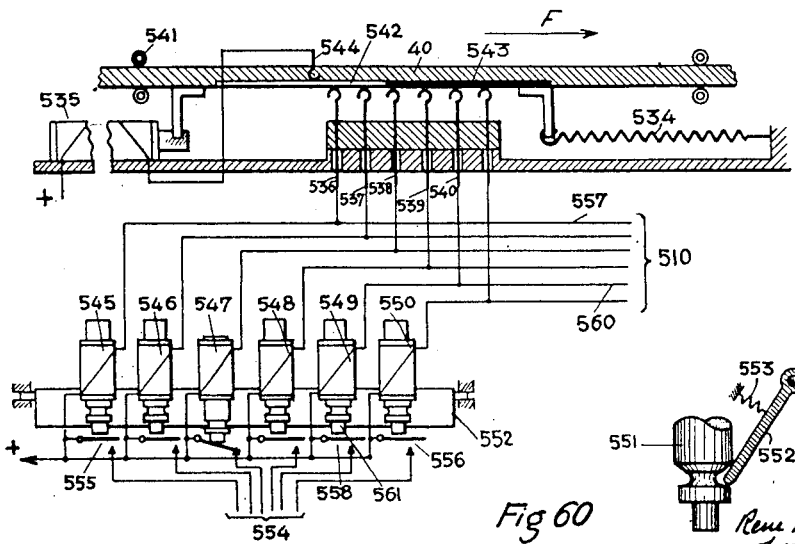
INVENTORS.
René Higonnet &
Louis Moyroud.
BY Kenway & Witter April 30, 1957

R. HIGONNET ET AL 2,790,362

PHOTO COMPOSING MACHINE

Filed Aug. 23, 1947

30 Sheets-Sheet 30

INVENTORS.
René Higonnet & Louis Moyroud.
BY Kenway & Witter
Attys.

United States Patent Office 2,790,362
Patented Apr. 30, 1957

2,790,362

PHOTO COMPOSING MACHINE

René Higonnet, Saint-Cloud, and Louis Moyroud, Saint-Genis Laval, France, assignors to Graphic Arts Research Foundation, Inc., Cambridge, Mass., a corporation of Delaware Application August 23, 1947, Serial No. 770,320

Claims priority, application France December 26, 1946

6 Claims. (Cl. 95—4.5)

The present invention relates to photographic type composing or type setting machines.

One of the objects of the present invention is to provide a type composing machine with which it is possible to obtain directly composed text of justified lines and with which the length of lines, sizes of characters and fonts can be changed at will by simple means.

Another object of the present invention is to provide a type composing machine for preparing the forms used in printing work, which may be operated as easily as a common typewriter, with the same speed and with which misprints may be instantly and conveniently corrected.

The present invention discloses also improvements to the arrangements described in copending applications of the applicants, Serial Nos. 610,334, now Patent No. 2,486,406, 610,335, now abandoned, and 610,336, filed August 11, 1945, and 700,937, filed October 3, 1946, now abandoned.

Figure 2:
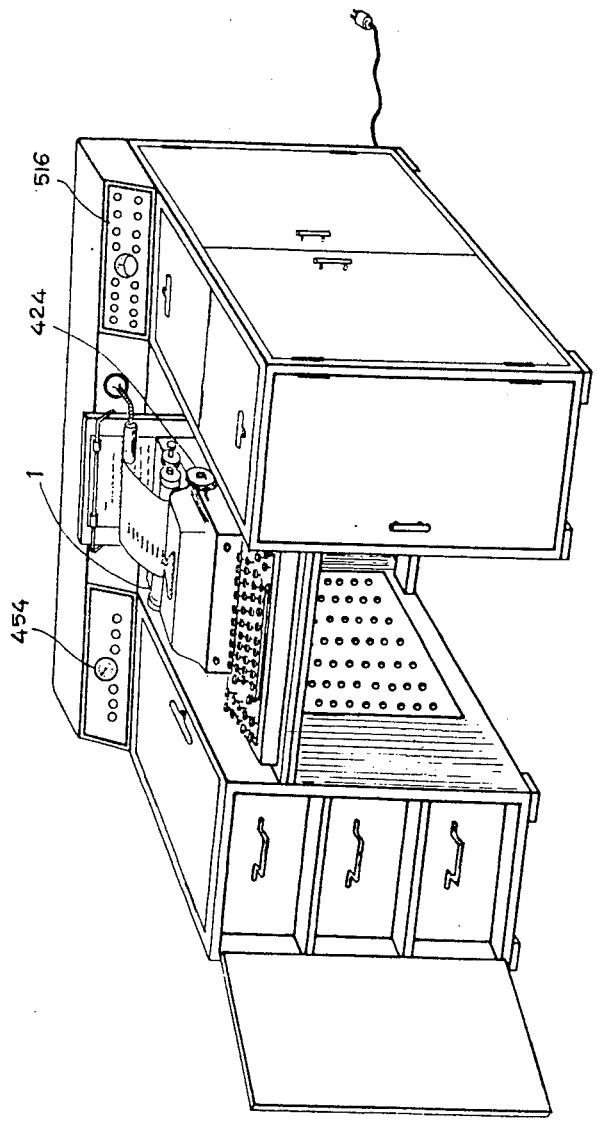
Figure 3:
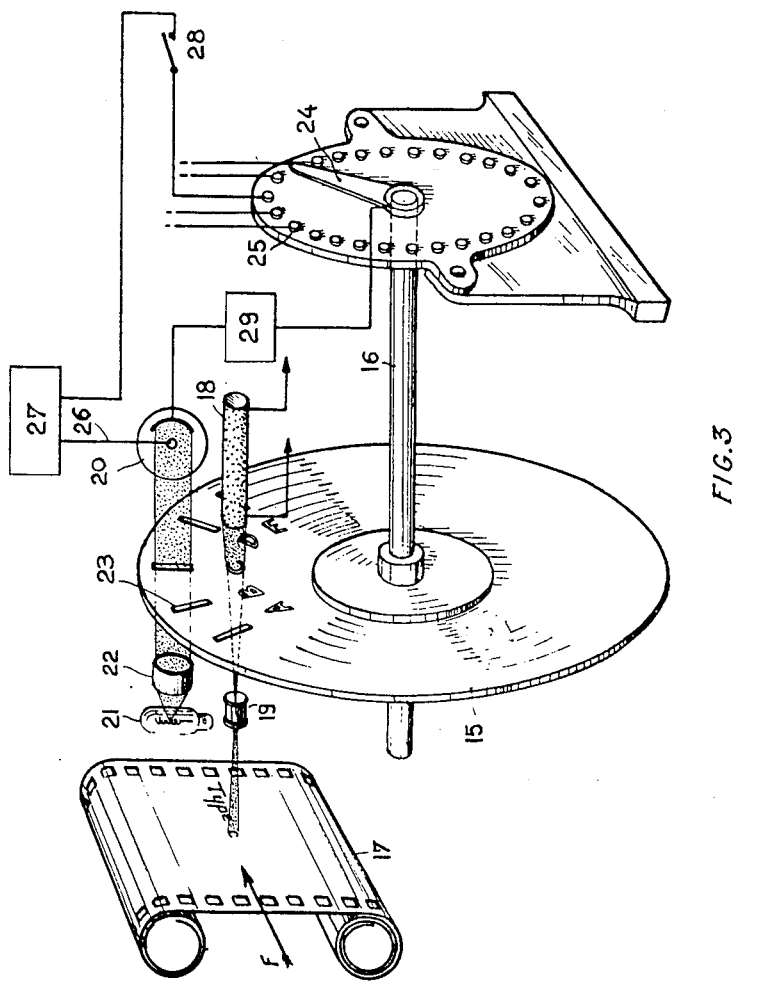
Figure 4:
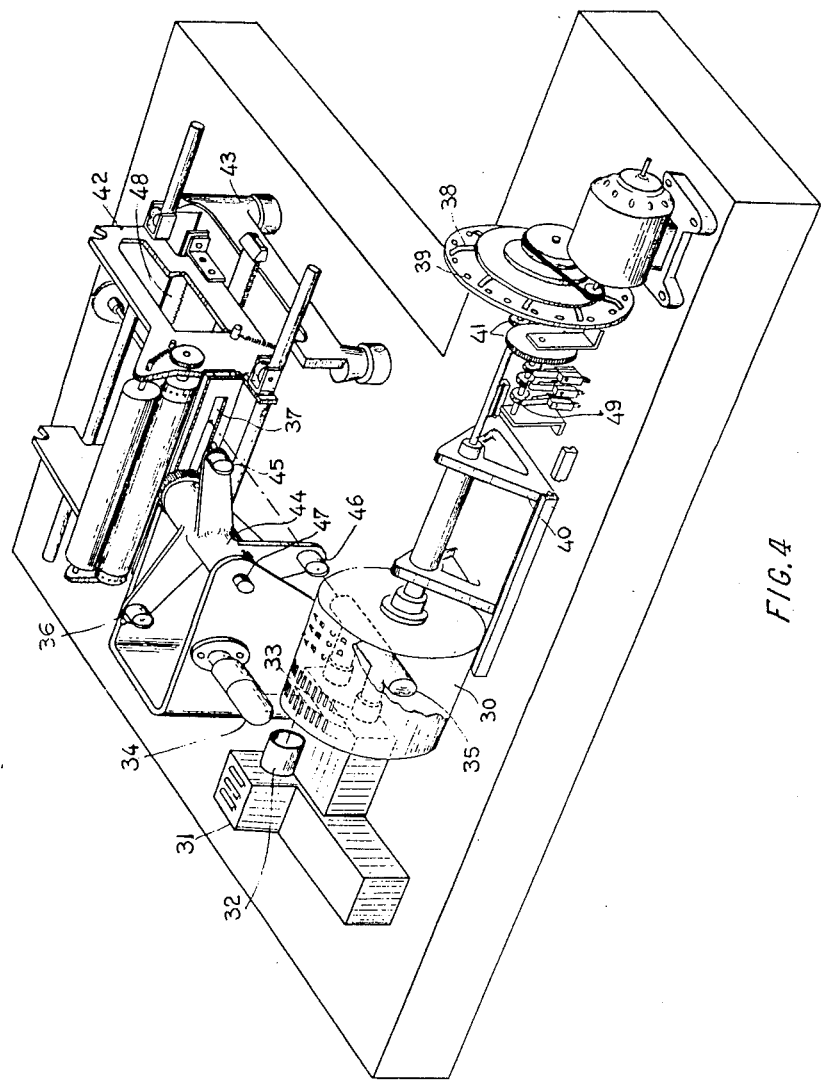
Figure 6:
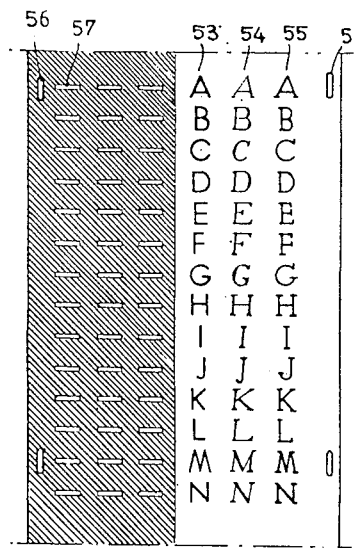
Figure 7:
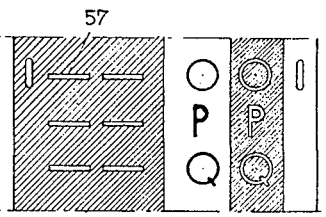
Figure 8:
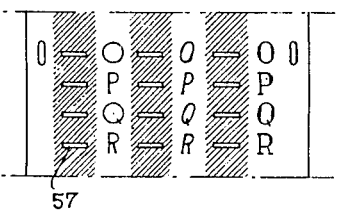
Figure 5:
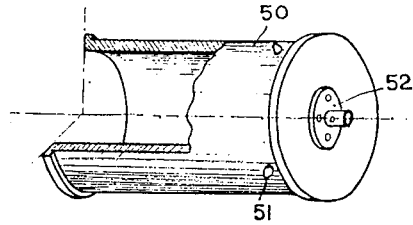
Figure 9:
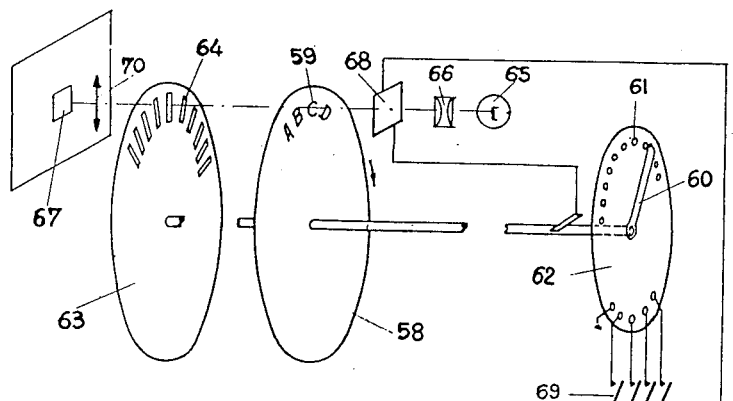
Figure 10:
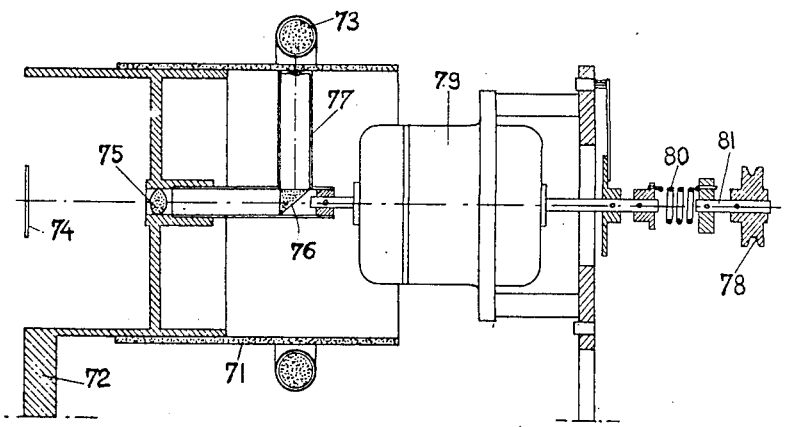
Figure 11:
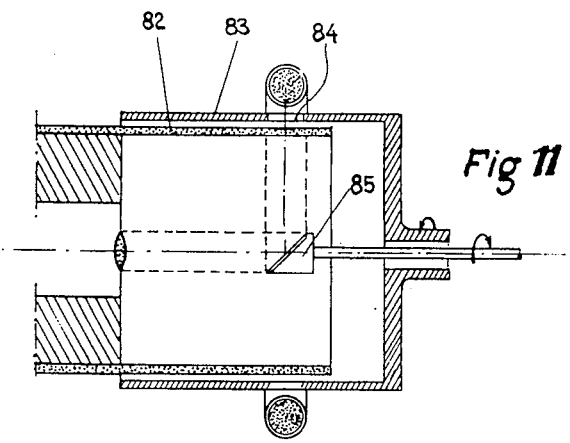
Figure 14:
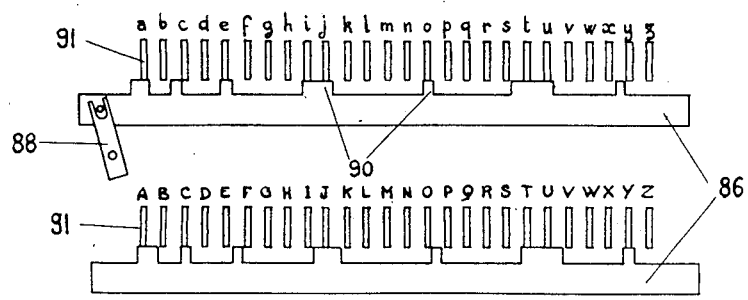
Figure 12:
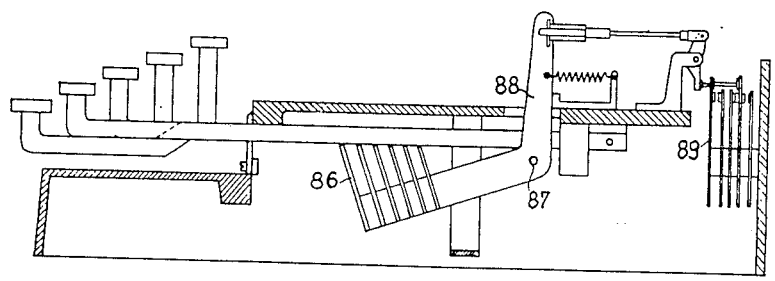
Figure 13:
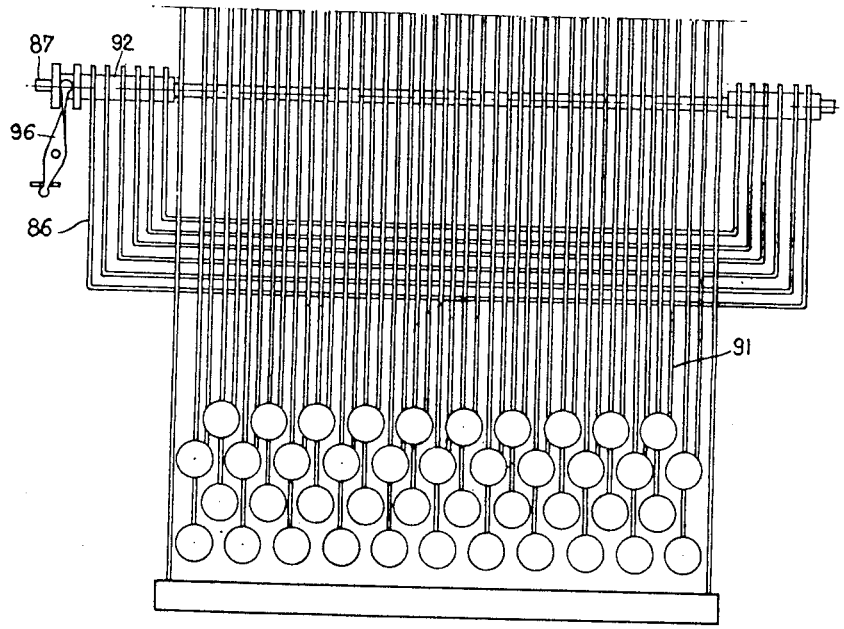
Figure 15:
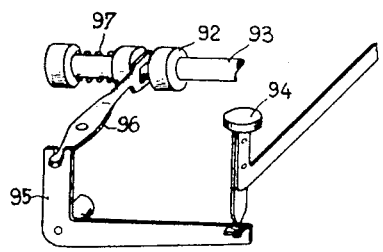
Figure 16:
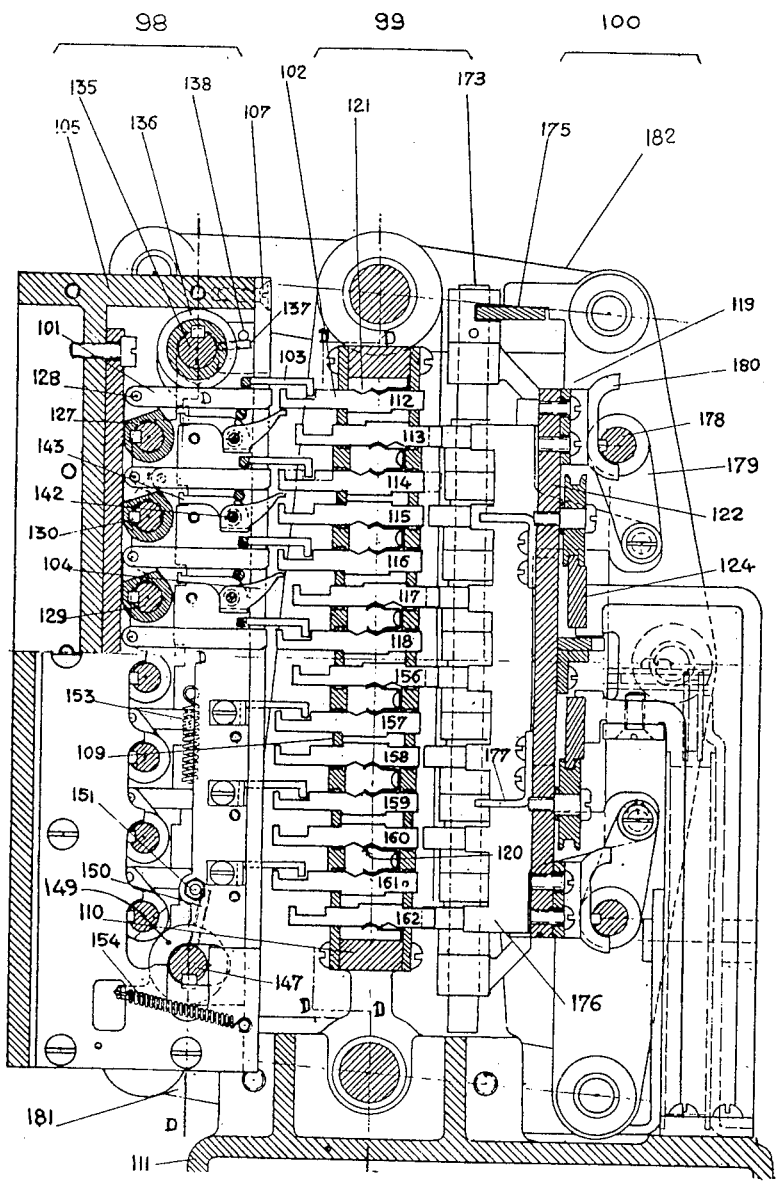
Figure 17:
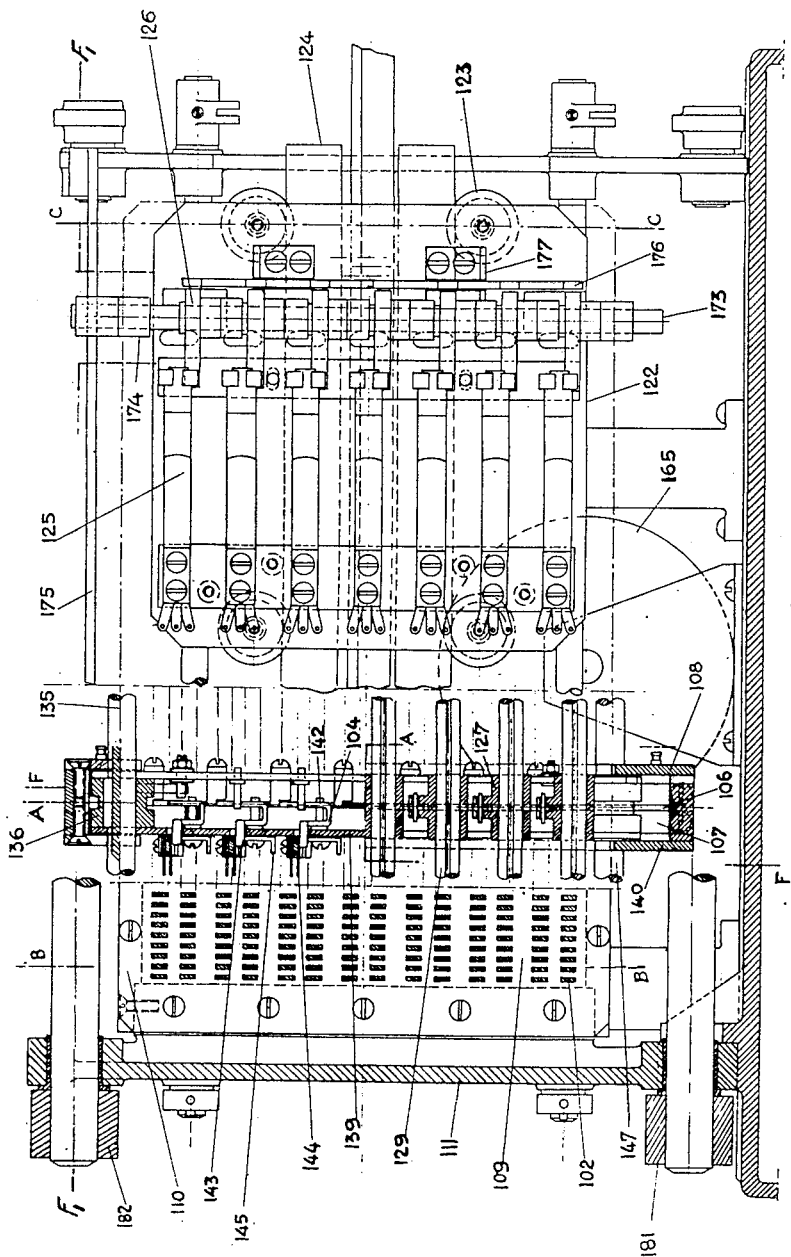
Figure 18:
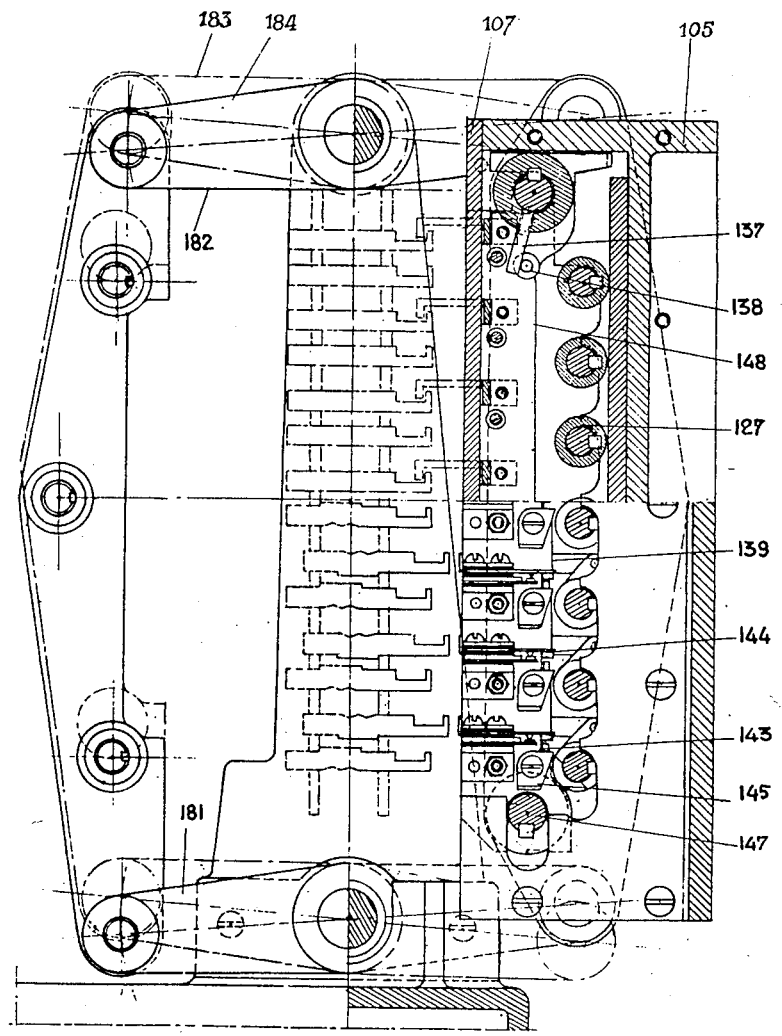
Figure 19:
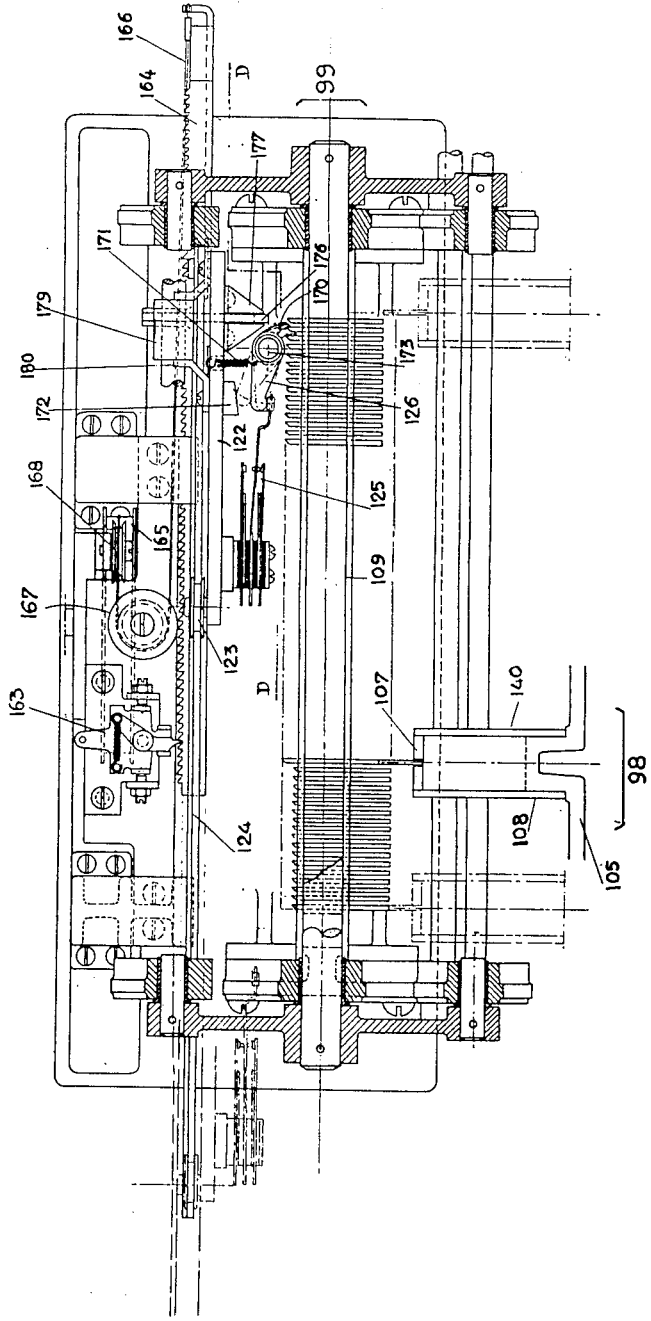
Figure 20:
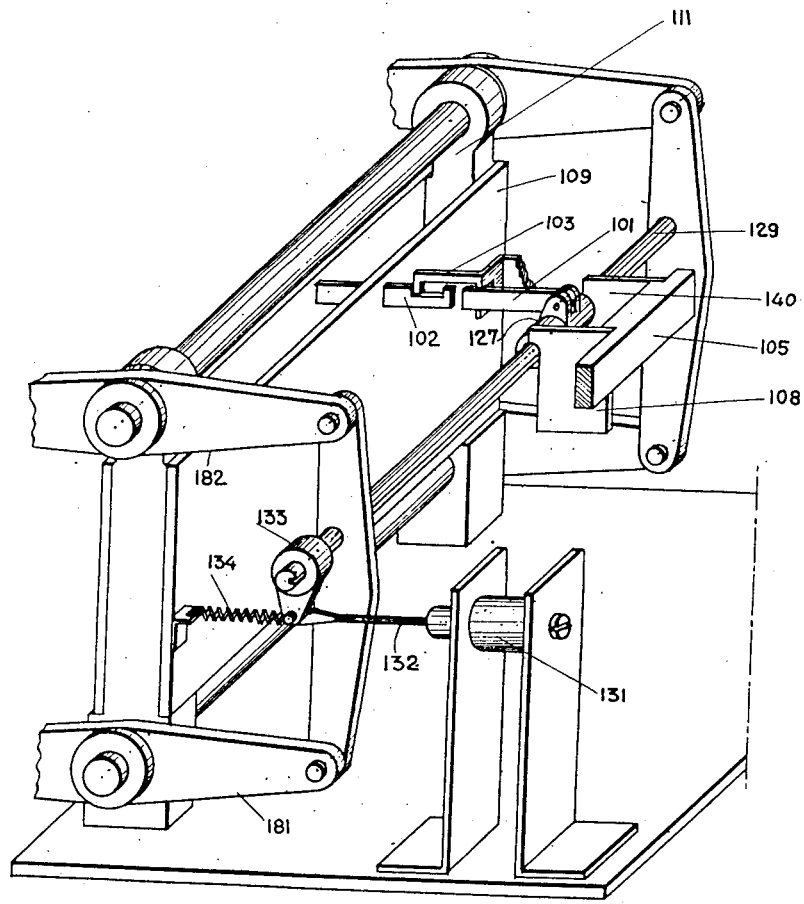
Figure 21:
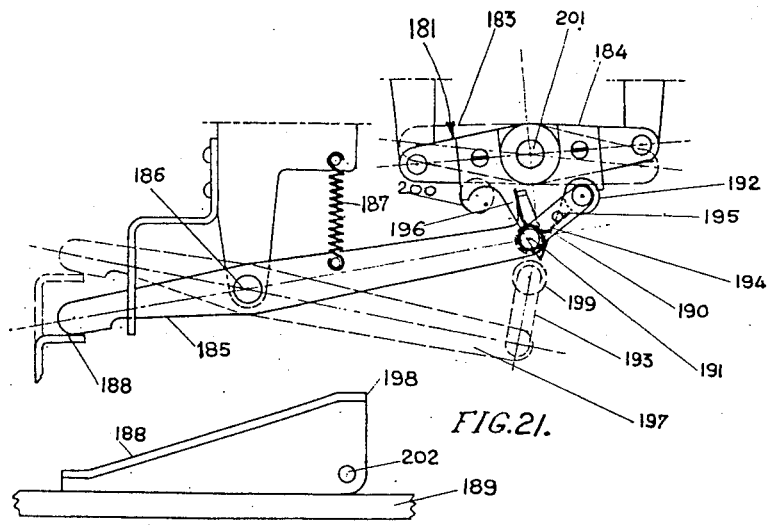
Figure 38:
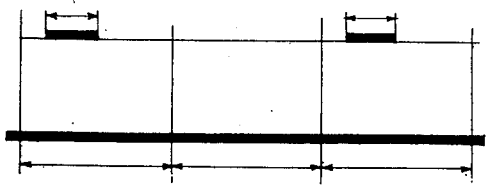
Figure 39:
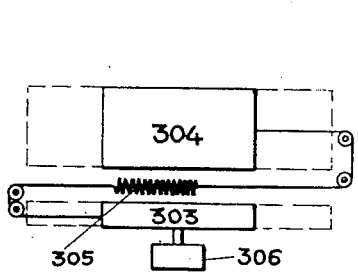
Figure 40:
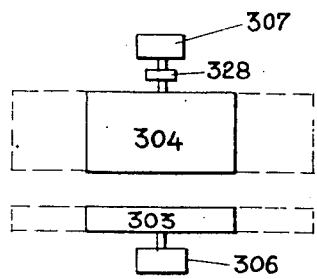
Figure 26:
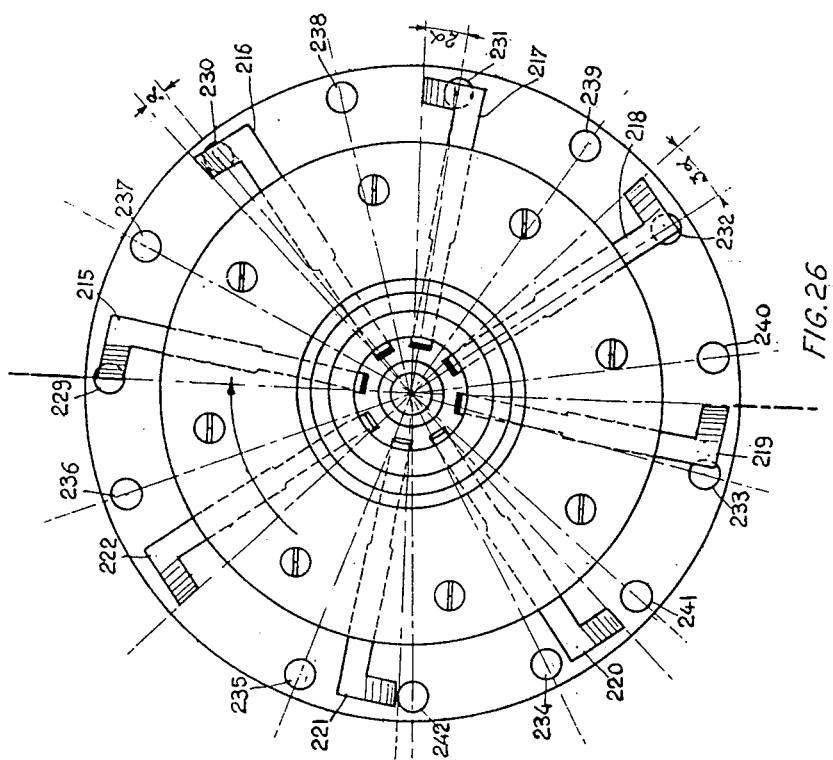
Figure 25:
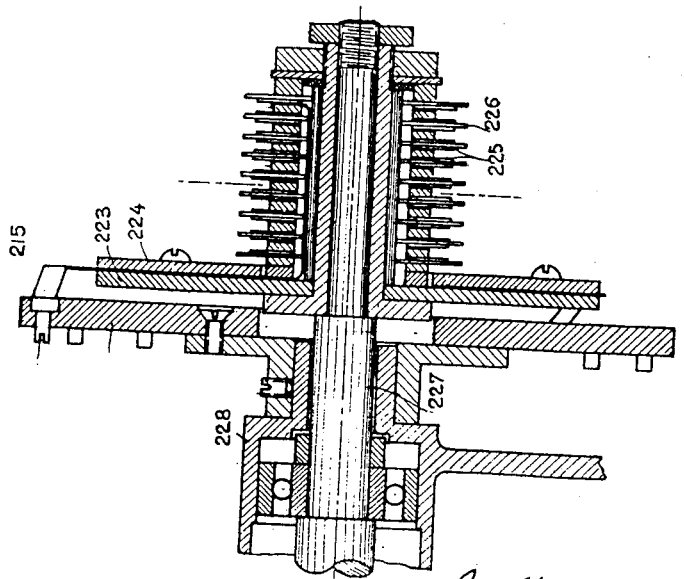
Figure 36:
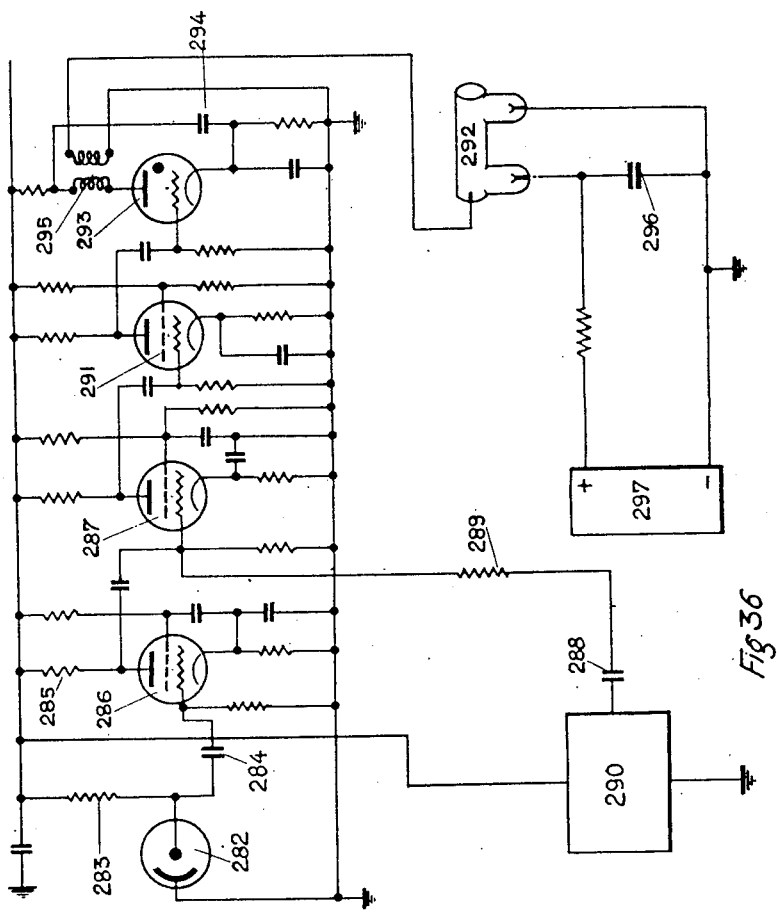
Figure 41:
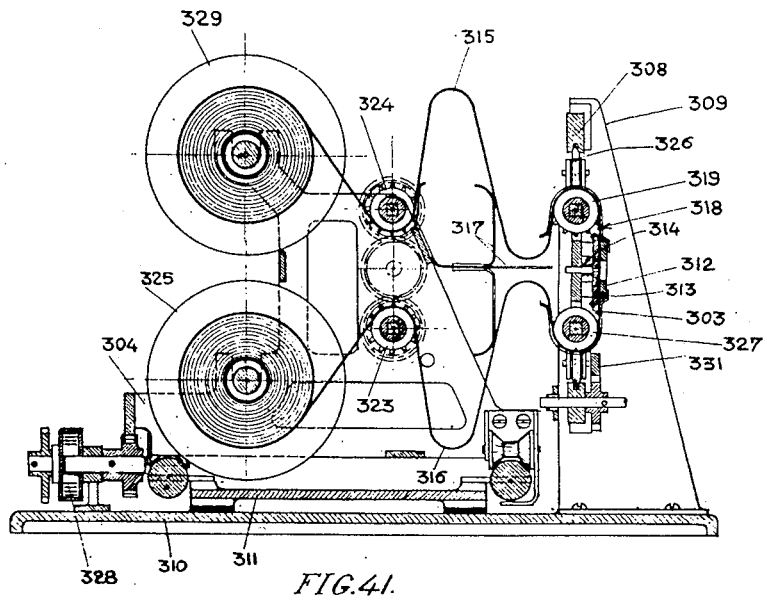
Figure 42:
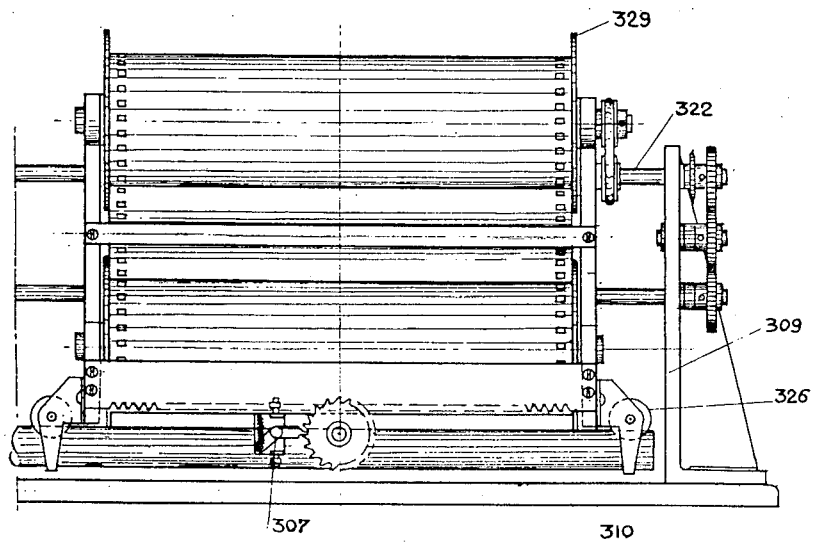
Figure 44:
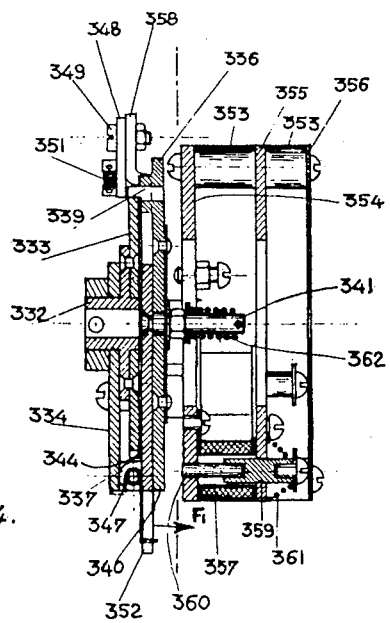
Figure 45:
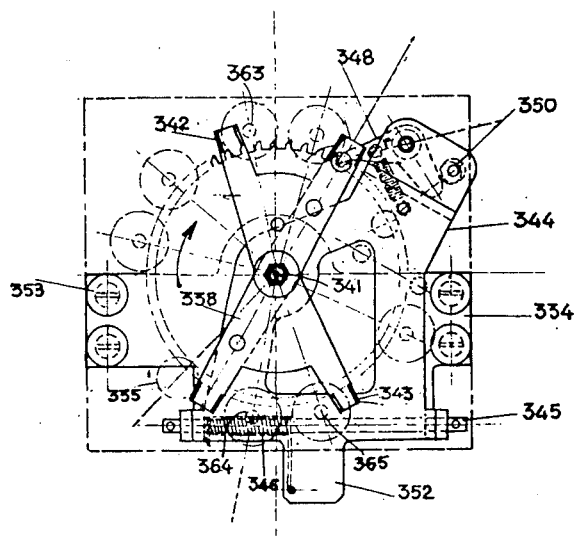
Figure 46:
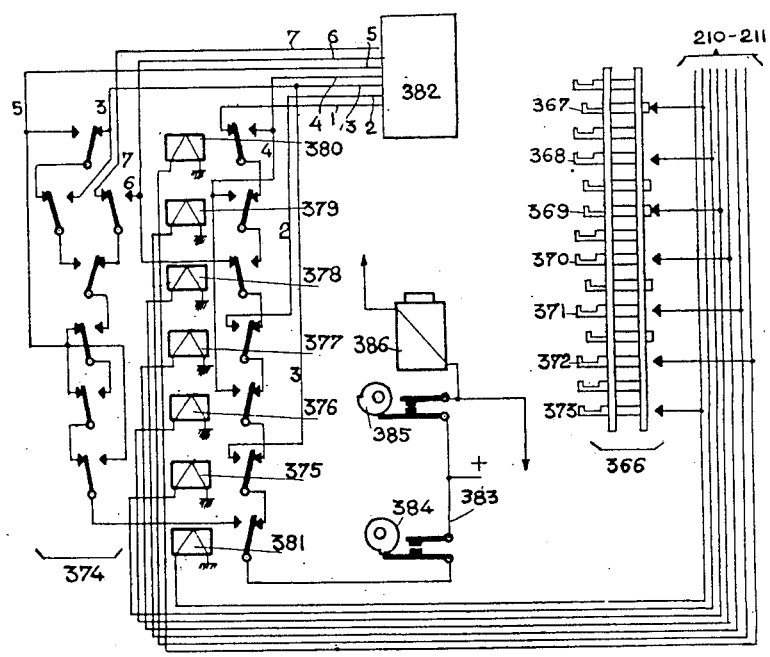
Figure 47:
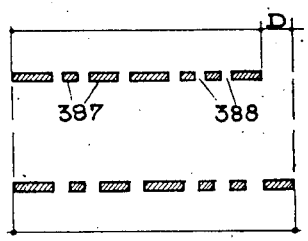
Figure 48:
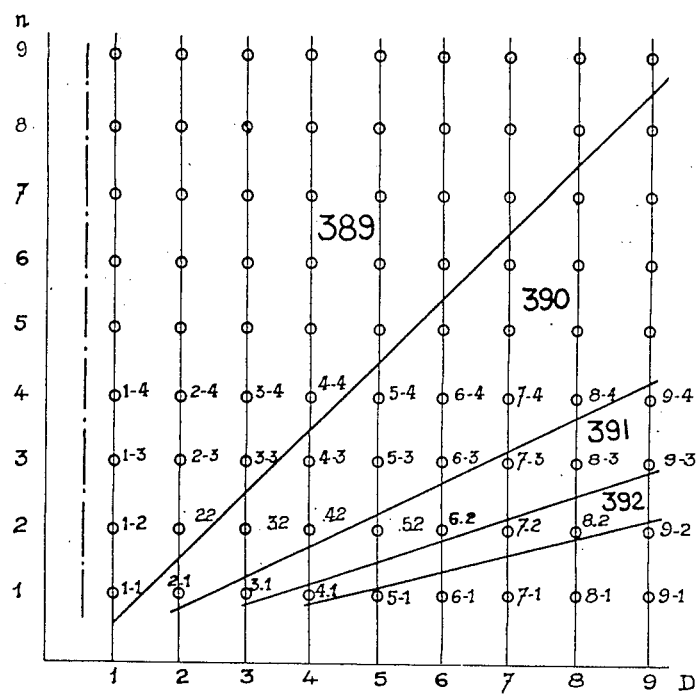
Figure 49:
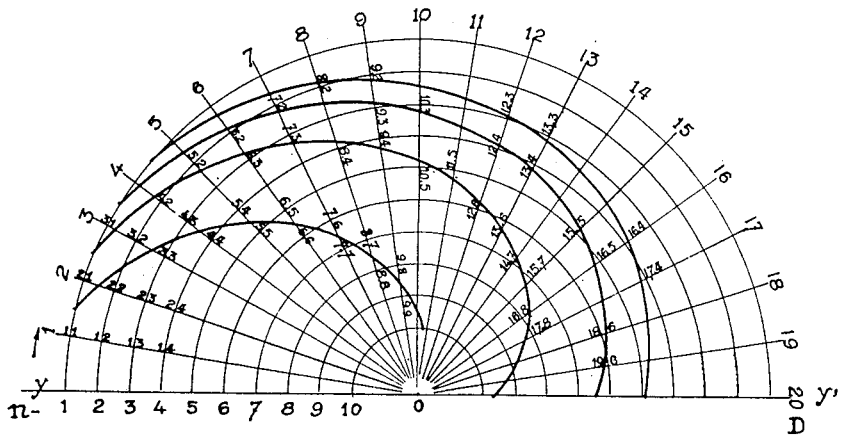
Figure 51:
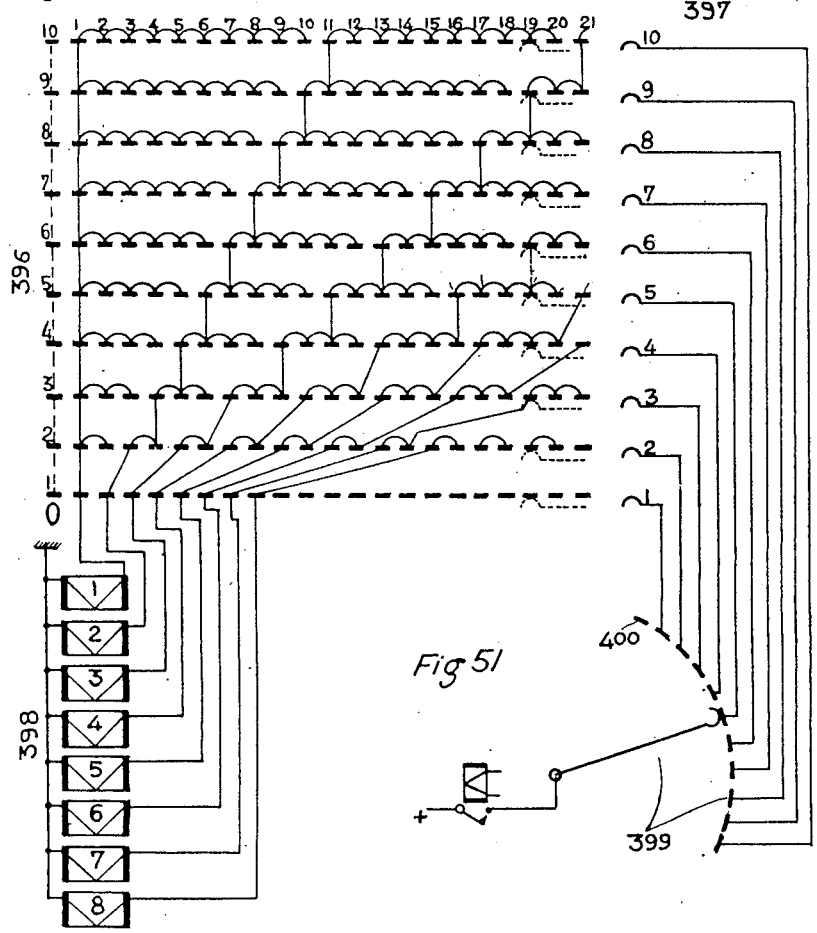
Figure 50:
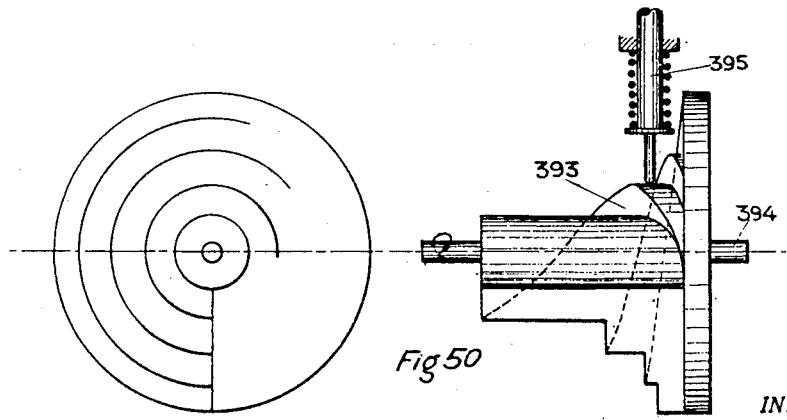
Figure 52:
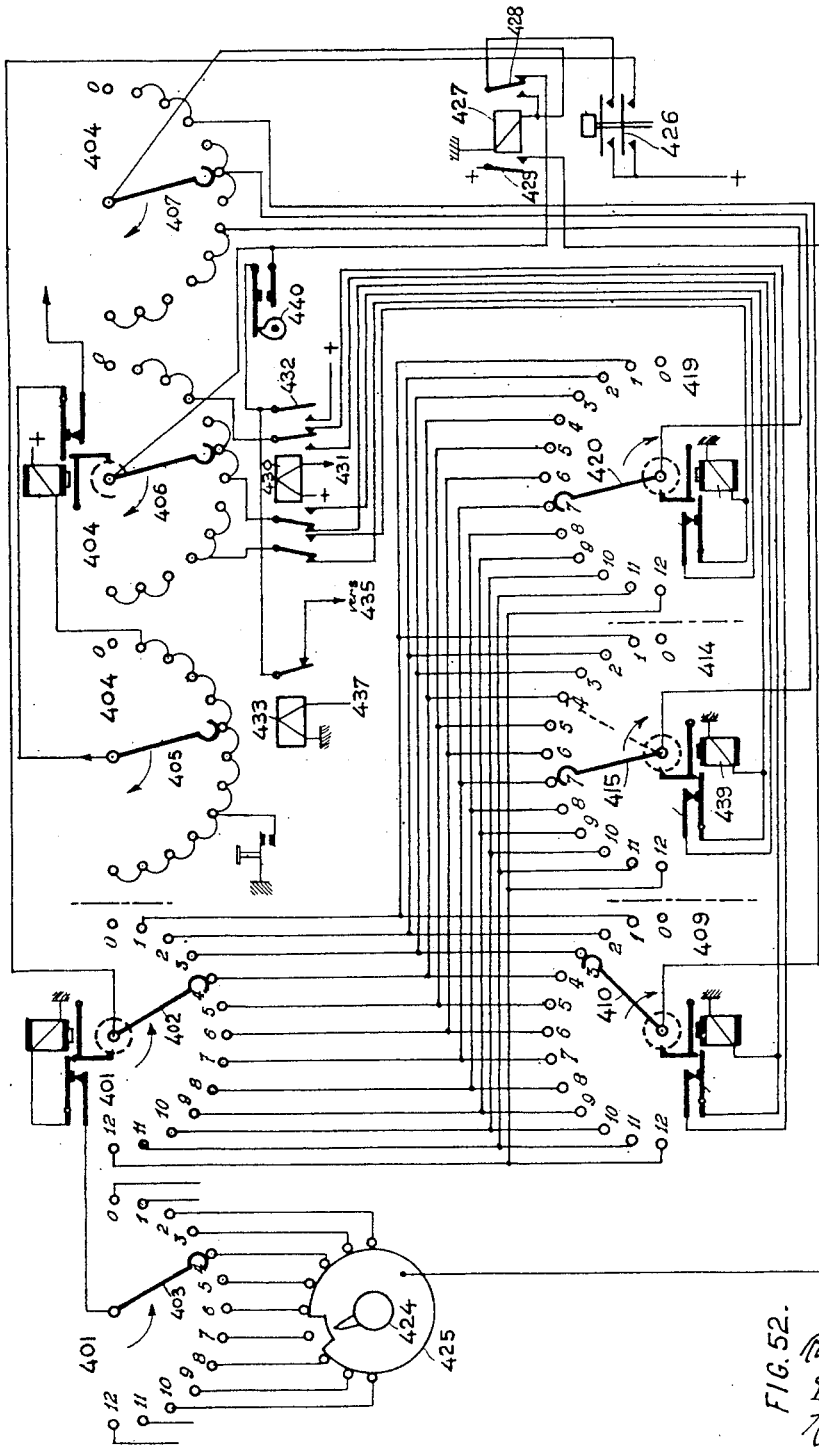
Figure 53:
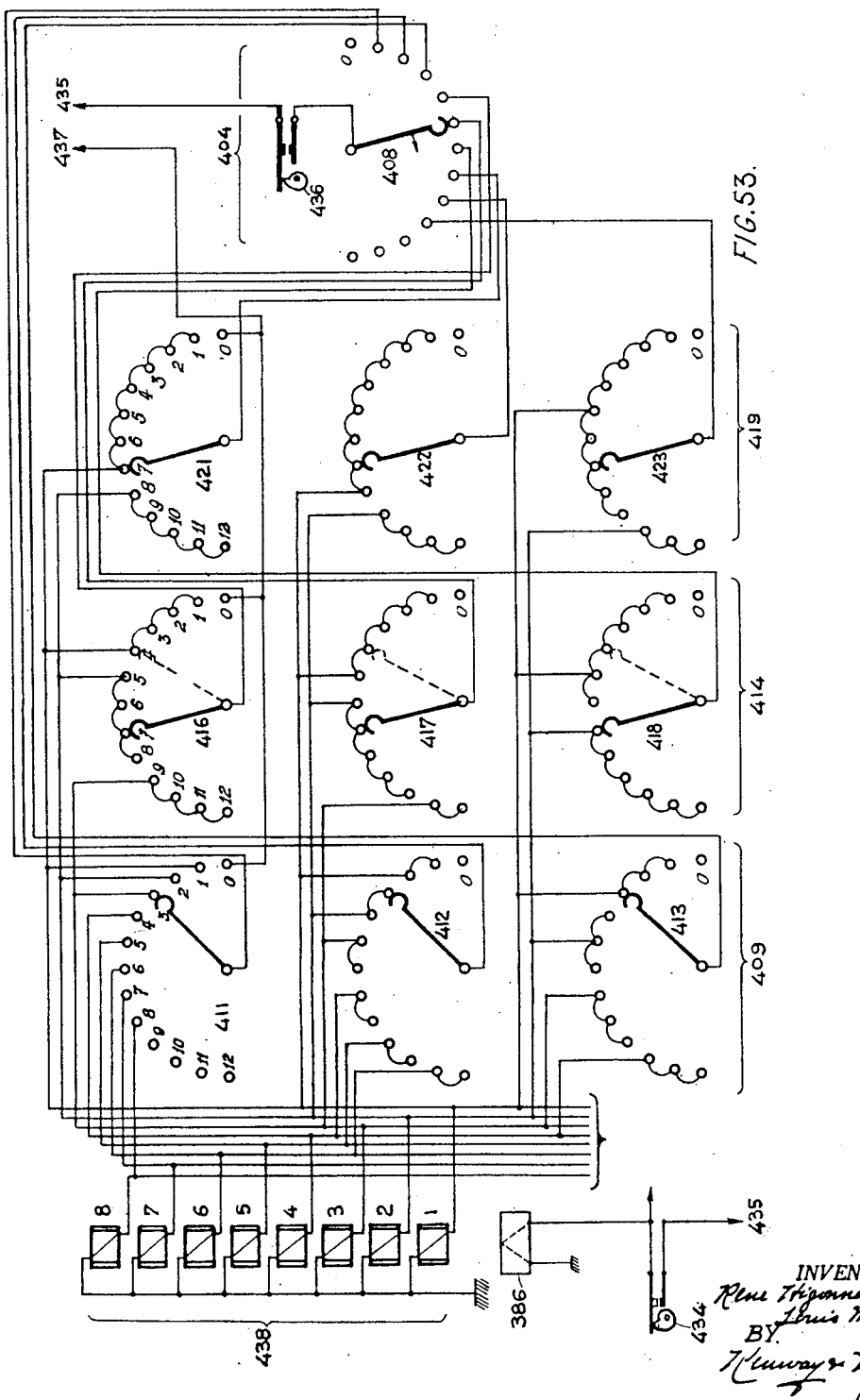
Figure 54:
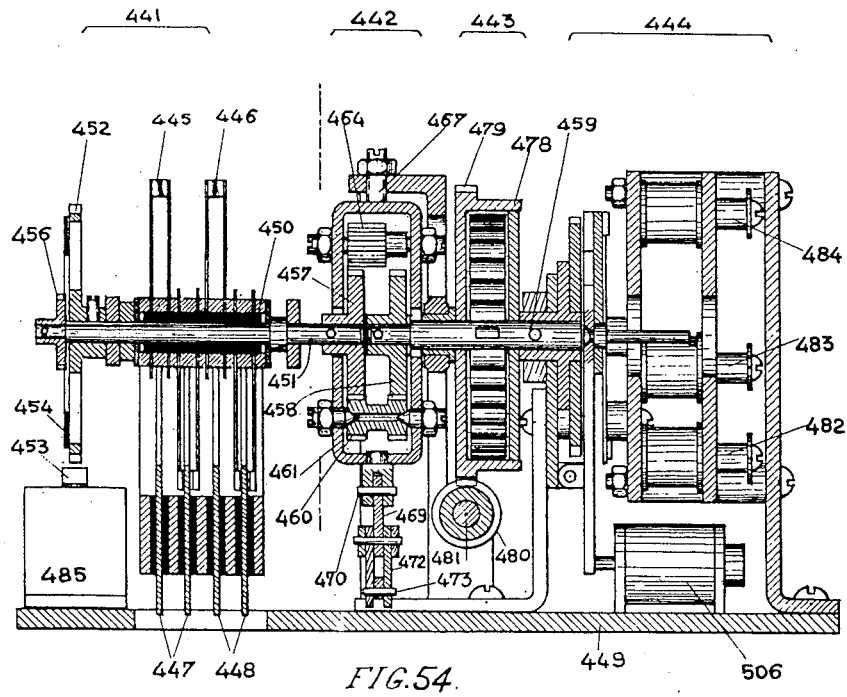
Figure 55:
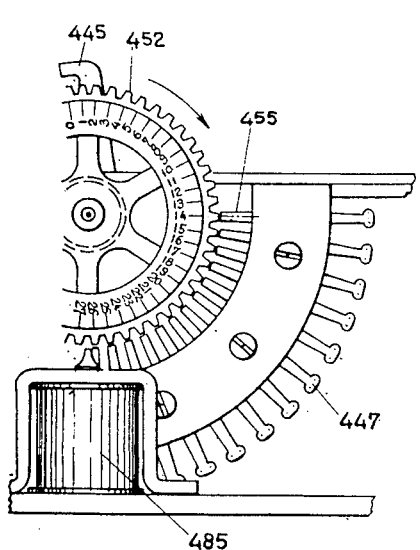
Figure 56:
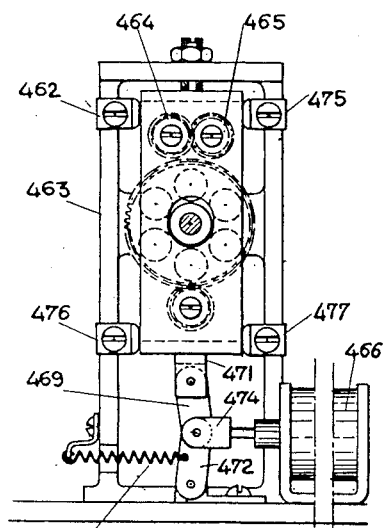
Figure 57:
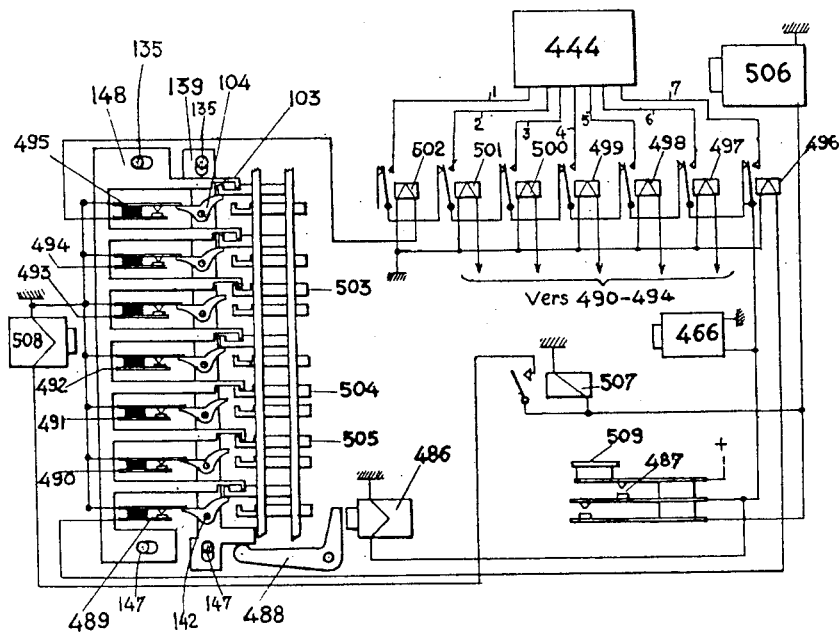
Figure 58:
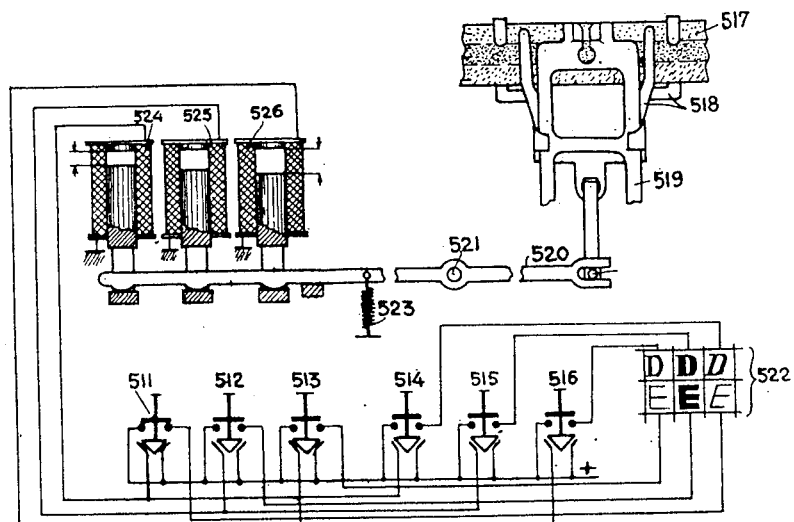
Figure 61:
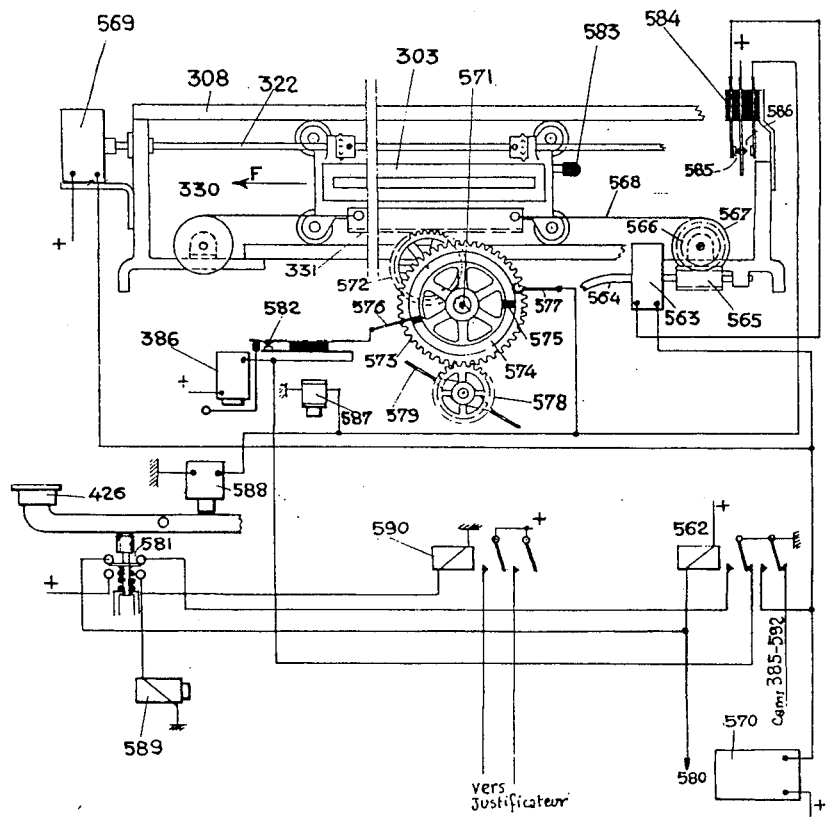
Figure 62:
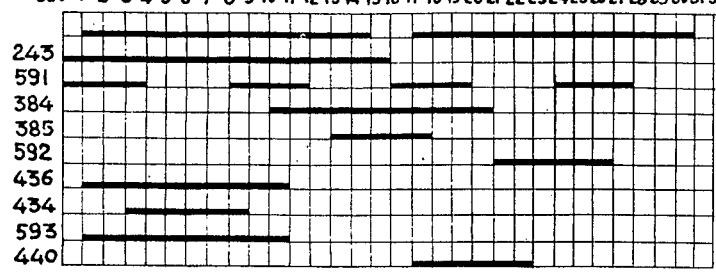

The various objects and features of the invention will be best understood from the following description of preferred embodiments of the invention selected for purposes of illustration and shown in the accompanying drawings, in which:

Fig. 1 shows schematically the principal units of the machine and the way these units are connected one with the other, Fig. 2 is a view in perspective showing one embodiment of the invention in a complete machine, Fig. 3 is a schematic view showing how the photographic unit of the machine operates, Fig. 4 is a perspective view of the photographic unit, Fig. 5 is a partial sectional view in perspective of the master character drum, Figs. 6, 7 and 8 are views of the master character sheets, Fig. 9 is a schematic view showing the stroboscopic arrangement of the master character drum, Fig. 10 is a view in longitudinal section showing an embodiment of the master character drum with a rotating mirror, Fig. 11 is a similar view showing another embodiment of the stroboscopic arrangement, Figs. 12, 13, 14 and 15 show the permutation bars as they are associated with the typewriter, Fig. 16 is a sectional view of the register part A along line AA of Fig. 17, part B along line BB of Fig. 17 and part B along line CC of Fig. 19, Fig. 17 is a sectional view along line DD of Fig. 16, Fig. 18 is a partial side view in section along line EE of Fig. 16, Fig. 19 is a sectional view along line FF of Fig. 17, Fig. 20 shows in perspective a partial assembly of the register, Fig. 21 (sheet 19) is a view in elevation of the rocking mechanism of the register, Figs. 22 and 23 show a modified registering device, Fig. 24 is the circuit diagram of the decoder using telephone relays, Figs. 25 and 26 are views in section and plan respectively of the decoder, Figs. 27 to 35 are diagrammatic views of an electronic decoder, Fig. 36 shows the impulse selecting circuit of the decoder, Fig. 37 shows diagrammatically the photoelectric impulses, Fig. 38 is a diagram of the operation of the film carriage, Figs. 39 and 40 are schematic views of the sensitized film carriage, Figs. 41, 42 and 43 are different views of the film carriage, Figs. 44 and 45 are views in section and in elevation of the escapement mechanism, Fig. 46 is a diagrammatic view of the selective advance translator, Fig. 47 is a schematic view showing how lines are justified, Figs. 48 and 49 are graphs used in the description of the justifier, Fig. 50 is a view in elevation of a mechanical justifier, Fig. 51 is a diagram of the circuit of an electrical justifier, Figs. 52 and 53 are diagrams of the auxiliary circuits of the justifier, Figs. 54, 55 and 56 are views of the line counter in elevation, side view and section, Fig. 57 is a diagrammatic view of the mechanism for making corrections, Fig. 58 is a diagrammatic view showing the usual control of the composed character, Fig. 59 is a perspective view of the matrix drum carriage, Fig. 60 is a diagram of the control circuit of the matrix drum carriage, Fig. 61 is a diagrammatic view showing the carriage return mechanism, and Fig. 62 is a timing diagram.

Referring to Fig. 1, the machine comprises essentially seven units: the keyboard 1, the registers 2 and 3, the counters 4, 5 and 6, the justifier 7, the carriage 8, the translator 9 and the photographic unit 10. The machine is operated by means of the keyboard 1 of a typewriter provided with permutation bars 11 which assign to each character one combination of a code, for instance a seven element code. Each character is thus characterized by a code combination which is stored in one of the registers 2 or 3. One line is recorded in a register associated with the typewriter platen. In the same time the register on which the preceding line has been recorded—and which has been severed from the typewriter—is associated with the photographic unit. The lines typed on keyboard 1 are therefore successively and alternatively stored in registers 2 and 3.

In order to make it possible to justify the lines, that is to say, increase the distance between words so as to bring all the lines to the same predetermined length, it is necessary to count the number of length units or elementary points comprised in each of the line characters as well as the number of interwords in the line. To this effect counters 4, 5 and 6 are provided. Counter 6 counts the number of length units occupied by each character or sign or interword and counters 4 and 5 count the number of interwords in the line. Two interword counters 4 and 5 are provided so that one of these counters controls the justifier while the other one records the number of the interwords of the line which is being stored. Counters 4 and 5 may be either successively and alternatively connected with the typewriter and with the photographing unit or one of them may be permanently associated with the typewriter and used to set the other one in the proper position when the line is finished.

The characters used in printing work are of widely variable width and it is therefore necessary to move the counter 6 selectively. To this effect this counter is controlled by a width translator 12, which will be later described in detail.

When one line has been stored, for instance in register 3, the operator, after he has checked to make sure that there is no mistake, connects through an appropriate control circuit (which may be operated automatically by the return of the platen of the typewriter) register 3 to decoder 9 to print photographically the stored line. The decoder 9 translates the code signals corresponding to the characters and, when the selected character passes in photographic position, operates a flash tube in the photographic unit 10 supplied by power unit 13. The sensitized film on carriage 8 is then moved by a distance proportional to the width of the character, this width is given by the width translator 14.

All these different units are connected only by electrical wires and may be arranged on a desk as shown in Fig. 2 or otherwise conveniently assembled.

The different units of the machine enumerated above will now be described in detail.

*Photographic unit*

Fig. 3 shows the principle of operation of the photographic unit. A disc (or drum) 15 bearing the master characters is mounted on a shaft 16 which spins at high speed. Disc 15 is provided with transparent master characters (or opaque characters on a transparent member) such as A, B, C, D, E, etc. Each of these characters is projected individually and successively on a sensitized surface 17 so as to make up words and lines. According to a feature of the invention the selected characters are projected one at a time after the sensitized surface has moved in the direction of the arrow, the amplitude of this displacement is determined by the width of the character previously printed. The print is made by illuminating the selected character during an extremely short time while disc 15 spins at a high speed.

The luminous flash given by tube 18 is of the order of a few microseconds and very powerful. The electrodes of this tube are connected to an electrical circuit which will be described later. An image of the illuminated character is made on sensitized surface 17 by lens 19 properly focussed on said surface. It is clear that the instant at which the flash occurs in tube 18 must be timed with an utmost precision, since it determines the position of the characters in the printed line as well as their alignment. According to another feature of the invention this instant is fixed with an extreme precision by an impulse generator which may comprise for instance a photoelectric cell 20 impinged by a light beam projected by a lamp 21 and an optical device 22. Short flashes of light are projected through slits 23 provided on disc 15. It is seen that an electrical impulse is generated by photocell 20 whenever a slit 23 opens the way to the light beam from lamp 21. This light beam may be limited to a thin luminous line in the plane of slits 23 by an optical device of the kind used in sound on film systems.

According to another feature of the invention the disc or drum 15 is provided with as many slits 23 as there are different characters, each slit being associated with one character and so located with regard to this character that said character intercepts or approximately reaches the optical axis of lens 19 at the very instant when the corresponding slit generates an impulse in the photocell circuit. Since an impulse is generated at each passage of a character it is necessary that only one impulse, viz. that corresponding to the selected character, triggers the flash circuit of the tube 18 in one revolution. This may be obtained by the simple arrangement shown in Fig. 3 comprising a brush 24 on the shaft 16 cooperating successively with a series of fixed terminals 25 at each revolution of the disc 15. There are as many terminals 25 as there are master characters on the disc 15, each terminal being associated with one character.

The impulses generated by the photocell 20 reach the trigger circuit 27 of the flash tube 18 by wire 26 only if the circuit is closed by the brush 24 and one terminal 25. Contacts 28 are associated with terminals 25 so that when the contact corresponding to the character to be photographed is closed, the amplifier 29 associated with the photocell 20 is connected into the circuit, and when the brush 24 passes over the associated terminal 25 the photoelectric impulse is transmitted to the trigger circuit and the flash tube operated. Improved selective circuits will be described herebelow.

In order to have a larger number of characters the master characters may be arranged on a drum instead of a disc, as shown in Fig. 4. In this figure the master characters are borne by a drum 30 in the form of parallel rows. The drum may, for instance be made of transparent plastic 50 (see Fig. 5), provided with pins or teeth 51 and a hub 52. By means of the teeth it is possible to place accurately on the drum a master character sheet (Figs. 6, 7 and 8). Each of these sheets is provided with characters of different fonts 53, 54, 55, transparent for instance. Perforations 56 are provided on the master sheet. To each character is associated a longitudinal transparent slit 57, or of any other appropriate shape, the purpose of which is to generate a light impulse whenever a character of the master sheet passes in photographic position, as it has been explained before in relation with Fig. 3. It is clear that it is possible to provide only one slit or aperture for each row of characters. The photoelectric device is then moved synchronously with the drum when it is desired to change the font, so that the optical axis of this photoelectric device is in alignment with said slits.

The master sheets are provided with transparent characters when it is desired to have a positive copy and with opaque characters when a negative copy is desired. It is also possible to provide the master sheets with both types of characters on the same drum as shown on Fig. 7. When the sheet is mounted on the drum 50 it suffices to slide this drum parallel to its axis to bring the positive or negative master character opposite the optical axis of the photographic unit. This arrangement, making it possible to change rapidly from positive to negative, is of interest since some processes require positive and others negative copies.

Although the master sheet shown on the drawings has only a limited number of characters, it is clear that a great variety of characters may be provided, so that it is seldom necessary to change the master sheet. One of the main advantages of the use of a control slit located close to the master characters on the same sheet is to tie the instant of occurrence of the flash with the passage of the character in photographic position. This makes it possible to use interchangeable master sheets and to counterbalance in this way the detrimental effect of expansion or contraction of these sheets. It is clear that the use of master sheets made up of films printed by simple photographic processes, for example contact prints from a master negative, is a great economy and makes it possible to have a large number of different characters at a reduced cost. Each sheet replaces one or several magazines of conventional type setting machines.

The operation of the machine will be better understood by reference to Fig. 4 where it is represented in a schematic form for the sake of clarity.

The master character drum is shown in 30, this drum bears one master sheet with three rows of characters of different fonts. The triggering slits are also visible.

The operation is the same as that explained in relation with Fig. 3. A lamp located in 31 projects an intensely illuminated line on drum 30, by means of lenses 32 and mirror 33. This luminous line acts on a photocell 34 each time a transparent slit intersects the optical axis of lenses 32 refracted by mirror 33. It is clear that a light tight arrangement separates the photocell from the flash tube.

As described above flash tube 35 will be primed only when the character to be photographed passes in photographic position and intersects the optical axis of lens 36, window 37 and flash tube 35. It is only at this instant that the electrical impulse will find a circuit prepared for it by a brush 38 with a terminal 39 as explained in detail with reference to Fig. 24 or will be made operative by an auxiliary impulse generated by an arrangement such as that of Fig. 33. This impulse triggers the flash circuit and a condenser charged at a high potential discharges into flash tube 35. The electrical circuit by which this result is attained will be described in detail later.

Drum 30 is rotating continuously and brushes 38 are fixed slidably to the same shaft and rotate synchronously. This shaft is journalled in a carriage 40 which may slide longitudinally in parallel ways, preferably on steel balls. It is thus possible to slide the drum along its axis with a minimum of wear and play; this is an important factor in view of the great precision necessary in a machine where the characters are printed in succession. When it is desired to select one of the three rows of characters and to bring it opposite to lens 36, it is clear that it is sufficient to move the carriage 40 bearing the drum 30 and to lock it in the desired position. In the same time as the new row of characters is brought in front of the lens, a new row of triggering slits slides in front of the photocell 34.

The characters are projected on a sensitized surface placed behind a window 37 of a carriage 42 which may be moved along a frame 43. The lens 36 is placed on a turret 44 bearing several lenses, 36, 45 and 46. This turret rotates about an axis 47 and can be locked in any of its three positions where one of the lenses 36, 45 and 46 is in the optical axis of the photographic unit. These lenses are of different focal length. This makes it possible to change the size of the printed characters without altering the distance between the master drum 30 and window 37. The lenses are also provided with different diaphragm stops so that all the images be of the same luminosity whatever is the ratio of enlargement of the characters. It is therefore clear that in order to change the size (or points) of the characters it is sufficient to rotate the lens turret in order to select the appropriate lens.

The carriage bearing the sensitized film 42 is provided with a rack 48 cooperating with a set of gears changing automatically the speed ratio when the lens turret is moved. Therefore the amplitude of the displacements of carriage 42 varies according to the size of the characters. It is necessary that no character be projected on the sensitized surface when the carriage is moving or when other mechanical adjustments are being made. To this effect one revolution of drum 30 is allocated to the photography of one character and the next revolution to the displacement of the carriage 42 and other mechanical adjustments. This is made possible by the use of cams 49 cooperating with electrical contacts and controlling the various circuits as will be explained later. Cams 49 are fixed on a shaft rotating at half the speed of the drum 30 by means of gears 41.

In another embodiment of the invention a stroboscopic arrangement is used instead of a flash tube. The master characters to be photographed are borne by a disc or drum rotating at a high speed, in front of this disc rotates another disc at the same speed but in the reverse direction. This second disc or drum is provided with narrow slits in the same number as the master characters. In this way a sharp image is obtained in spite of the continuous rotation of the master disc, the width of the character image is however reduced to one half. In order to obtain a character of the correct shape it is sufficient to double the width of the master characters. A lens shutter or other appropriate device operates at the instant when the character selected passes in photographic position.

Fig. 9 shows a stroboscopic arrangement including the disc 58 which bears the master characters 59. On the same shaft is mounted a brush 60 adapted to wipe a series of fixed terminals 61 on fixed disc 62, in the same number as the characters. On the same axis, but revolving in the opposite direction is the shutter disc 63 bearing as many slits 64 as there are characters on the disc 58. A lamp 65 and an optical lens system 66 project on the character to be photographed a light beam of high intensity. Matrix disc 58 and the shutter disc 63 are placed as close together as practicable, although they are shown as spaced apart in the drawing for the sake of clarity. A shutter 68 is provided with the optical system so that the exposure is made only when the selected character passes in photographic position. When the selected character passes in front of the exposure window 67, the lens shutter is operated and remains operated until said character has been completely scanned by the slit 64 of the cooperating disc 63. The lens shutter 68 is actuated at the appropriate instant by means of brush 60 when it comes into contact with the terminal 61 of the disc 62 corresponding to the depressed key 69. The brush 61 finds an electric potential which has been applied by means of the key 69 and this potential actuates shutter 68. The duration of this contact is chosen such that the exposure be equal to the duration of the passage of the character in front of the exposure window 67. The image is shown in 70. The rotation in opposite directions of the matrix and the shutter disc may be obtained by means of bevel gears.

Fig. 10 shows a photographic unit in which the master character drum 71 is fixed in its position. This drum comprises several rows of characters of different fonts and is movable sideways by means of the sleeve 72. As it has already been explained it is possible by a longitudinal displacement of the drum to select a desired font by bringing it in register with the optical axis and the lamp, for instance a discharge tube of annular shape 73. When this tube flashes, all the characters of one row of the drum are illluminated but only one is projected onto the sensitized surface 74 by the lens 75 by means of an optical arrangement comprising a reflecting surface 76 and a tube 77 terminated at its end close to the drum by a window of the same size as the characters. This mirror and sleeve 76—77 spin at a high speed and by means similar as have been described previously in relation with Figs. 3 and 4, the discharge tube 73 is flashed at the exact moment when the selected character passes in photographic position. Thus a sharp image is obtained on the sensitized surface 74. The characters on the drum 71 are of course arranged to give straight images. This may be easily obtained by using the arrangement in the reverse way.

This arrangement has the advantage of light moving parts. The selection of a type of characters is also facilitated since it is easier to slide a steady drum 71 than a rotating one.

According to other features of the invention means may be provided to slow down the mirror shortly before the occurrence of the exposure flash. This makes it possible to have longer exposures, which may be of interest when slow films are used. To this effect, instead of driving directly the mirror or prism 76 by the pulley 78, a motor 79 is placed between said pulley and said mirror. This motor is connected to the pulley by a resilient arrangement comprising a spring 80 fixed on one side to the shaft of the motor 79, and on the other side to the shaft 81 of the pulley 78. Slightly before the mirror reaches the photographic position a condenser is discharged into the motor 79 which is normally idle. The motor is connected to the condenser in such a way that the condenser discharge tends to make the motor revolve in the opposite direction to the pulley 78. The braking effect thus obtained may be adjusted at will by acting on the capacity of the condenser and its potential. Tests have shown that the mirror may thus be brought to rest with a high degree of accuracy when the pulley is driven at the high speed of ten revolutions per second.

Figure 31:
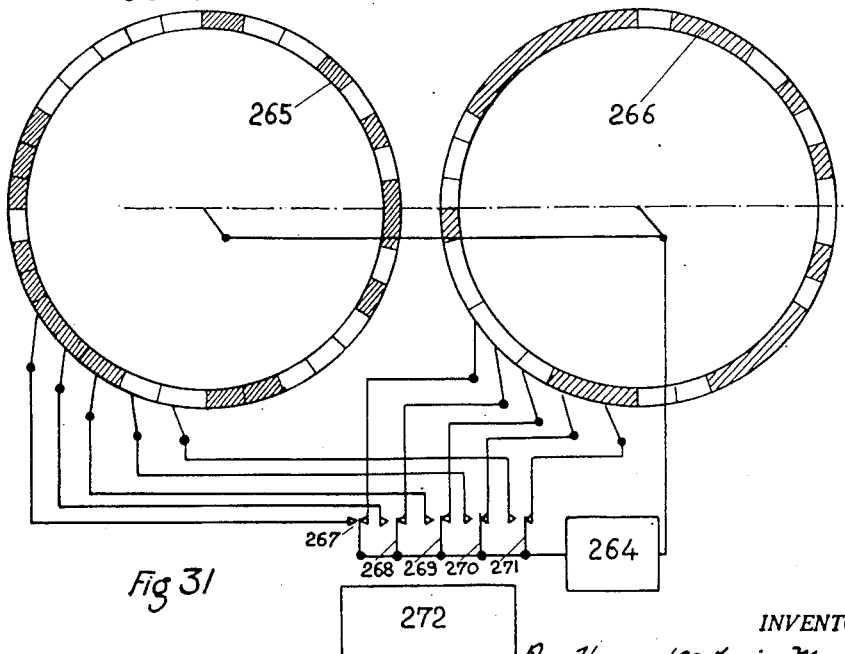

Various means may be used to control the discharge of the condenser into motor 79. If for instance the decoder shown in Fig. 31 is used two triggering circuits may be used operating at short time interval. This is easily made by using two such triggering devices, one associated with the pulley 78 and one with the motor 79. To this effect the brushes of these two decoders are slightly staggered. The first one brings the motor almost to a stop and the tube 73 is flashed when the brushes associated with the motor 79 reach the combination of the selected character at a greatly reduced speed. A much longer exposure may thus be used, for instance ten or a hundred times longer.

Fig. 11 shows a modification including a stationary drum 82 with a stroboscopic arrangement similar to that of Fig. 9. In this figure the drum 82 bears the master characters. Close to it revolves another drum 83 provided with as many slits 84 as there are characters. This second drum revolves with the same speed as the mirror 85, but in the opposite direction. In this way the same stroboscopic effect is obtained as in the mechanism of Fig. 9, but with a simpler mechanical arrangement.

*Storage of a line*

The type composing machine according to the present invention includes a keyboard, for instance that of an electric typewriter. The employment of a typewriter as part of the organization enables the operator to read what he has typed and permits him to check whether each line is correct and make the necessary corrections if needed before he gives the signal which sends the completed line to the photographic unit to be photographed.

In order to make corrections possible and also to justify the lines, that is to say, equalize the margins, it is necessary that each line be recorded or stored in a special storage device. According to the invention a storage device is used which is attached to the platen of the typewriter. In this way corrections may be easily effected and tabulation is made possible.

In order to simplify the registers the characters are recorded in a code arrangement by means of a small number of members or pins which may occupy two different positions. These recording elements may be flat sliding members as shown in Figs. 16 to 21.

With $n$ members it is possible to record $2^n$ different characters. It is customary in printing work to use 100 to 120 different characters in one font. To characterize such a number of characters seven recording members must be used which may record $2^7$ i. e. 128 combinations.

The code translating system associated with the typewriter keyboard for operating the register may comprise an arrangement of seven permutation bars or bails as shown in Figs. 12, 13, 14 and 15. These bars 86 rotate about a shaft 87. Each bail when depressed pulls a lever 88 and operates a set of contacts 89 associated with the electromagnets of the register. The permutation bars 86 are provided with indentures 90 (see Fig. 14) so that these bars are selectively depressed by the typewriter bars 91.

It may be of interest to change completely the code combinations associated with the typewriter bars when the shift key is operated. This is obtained by mounting the different bars 86 on a sliding member 92. The bars 86 may then be displaced longitudinally. One bar 86 is shown in Fig. 14 in the two positions it may occupy. The upper part of this figure shows the permutation bar 86 below the type bars 91 when small letters are being typed, and the lower part of the figure for capital letters when the shift key has been actuated. It is clear that in the upper part of the drawing the permutation bar 86 will be depressed when the following small letters are typed, a, e, i, j, o, u while the lower part of the drawing shows that, after the sleeve has been moved along the shaft 93, bar 86 will be depressed for the following capital letters, A, C, J, U, Y.

It is of course necessary in this arrangement that the bars 86 be longitudinally displaced when the shift key of the typewriter is depressed, and this result may be obtained by means of the device shown in Fig. 15. When the shift key 94 is depressed the sleeve 92 is moved by means of levers 95 and 96 against the spring 97.

A preferred embodiment of the registering device is shown in Figs. 16 to 21. In this arrangement the combination of displaced pins representing a line of characters are set by a group of seven hammers following the displacements of the typewriter platen and travelling in front of a fixed frame provided with sliding pins. This device may be divided, for the sake of the description, into three main groups or sections designated by 98, 99 and 100 in the drawings. Section 98 comprises the seven hammers 101, adapted to push from idle position into operative position a selection of flat pins 102 while a line is being typed. This section includes also means for correcting erroneous settings, that is to say, means to erase a character, said means comprising, in group 98, hooked members 103, one for each hammer, and adapted to reset the seven pins of the vertical row opposite the seven hammers.

Correction feelers 104 are also provided for detecting the code arrangement of the pins before they are reset in order to substract in the line counter a number of units corresponding to the width of the erased character as will be explained length later.

The partial assembly 93 follows all the displacements of the typewriter platen to which it is directly and rigidly connected by the member 105. This sub-assembly follows the platen when a line is typed or when the operator displaces the typewriter platen for instance for a correction or tabulation work or when he depresses the "Back spacing" key. This assembly has, near the frame bearing the sliding pins, an elongated opening 106 provided between two guides 107 rigidly secured to the member 105 and mounted thereon so that its axis is exactly opposite the axis of a vertical row of pins when the typewriter is at rest. When the platen escapes one tooth and moves one step the opening advances also one step and reaches a position opposite the next vertical row of pins. This opening is used to guide hammers 101, feelers 104 and erasers 103. These various elements are slidably mounted in the opening, the width of which is preferably equal to half the pitch of the typewriter.

Subassembly 98 moves on one side of the fixed assembly 99 which comprises mainly two perforated plates 109, spaced by spacers 110 and secured to a frame 111. The plates 109 are provided with rectangular perforations in which are slidably mounted flat pins 102. Each of these sliding pins may occupy selectively one of two positions, an operating position 113 and an idle position 112 (Fig. 17). When the operator begins to type a new line all the pins of the rows opposite the hammers are in the idle position and a combination of pins is pushed into operating position, in the same time the corresponding character is printed on the typewriter platen. Each pin is securely maintained in one of these two positions by a spring 120 engaging a notch 121 in one side of the pin.

The pins are arranged in horizontal rows, each row comprising as many pins as there may be characters in the longest line. The pitch or distance separating the axes of two consecutive pins is equal to the typewriter pitch. In the embodiment shown fourteen horizontal rows are provided, seven rows cooperating with assembly 98, while the seven other rows, on which the preceding line has been stored, cooperate with the assembly 100. This last assembly comprises a scanning carriage formed of a plate 122 provided with grooved rollers 123 travelling on the edges of fixed bars 124 and bearing seven make-and-break contacts 125, actuated by the seven feelers 126 displaced along the assembly 99 by said scanning carriage. This latter travels step by step and is controlled by the photographic unit, the length of each step is exactly the same as the pitch of the rows of pins.

In résumé the register comprises two mobile sub-assemblies 98 and 100 which may move independently on each side of a fixed assembly 99. The first assembly is controlled by the typewriter, while assembly 100 is controlled by the photographic unit.

The different sub-assemblies will now be described in detail.

Assembly 98 bears seven hammers 101, each formed of a flat member pivotally connected to a rocking lever 127 by a pin 128. Each lever 127 is integral with a sleeve sliding freely along the shaft 129 but is compelled to rotate with the same shaft by means of a feather 130 sliding in a keyway cut into the shaft, said feather or sliding key 130 being held between two plates 108. These plates 108 are secured to member 105 so that they compel the levers 127 to follow all the displacements of the typewriter platen. The hammers are actuated individually and selectively by electromagnets such as 131 (Fig. 20) which are provided on one side of the frame and effective to rotate the shafts such as 129 when they are energized, through a convenient linkage 132 and a lever 133 keyed on the shaft 129. When they are rocked by the electromagnets selectively energized by the contacts operated by the permutation bars of the typewriter, these shafts 129 rock levers 127 whatever may be the position of these levers along the shafts and the corresponding hammers are pushed towards the frame 99, against spring 134. The hammers are subsequently advanced one step in the same time as the typewriter platen.

When a correction is needed the platen is first returned to place the character to be erased in the printing position of the typewriter. A key "Erase" is then depressed which, as will be explained later, actuated the line counter backwards and brings all the pins opposite the hammers back to the rest position. This key energizes an electromagnet (not shown) and rotates the shaft 135 in counterclockwise direction. This shaft drives a sliding sleeve 136 by means of a key provided in the shaft. A projecting stud 137 screwed into said sleeve 136 pushes upwards a stud 138 together with the plate 139 in which it is fixed.

The plate 139 is provided with elongated holes through which passes shaft 135 and which enable said plate to slide vertically freely. This plate is limited to move only in its own plane by one of the guide plates 108—140 and the sliding sleeve. The plate 139 is provided with seven feelers 141, with two tails, loosely pivoted on the pins 142 mounted on the plate so that, when this plate is pushed upwards, all the feelers finding on their path a pin in the idle position will be rocked clockwise, the tails 143 open the associated correcting contacts 144. It appears that when the plate 139 is pushed upwards the correcting contacts corresponding to the depressed pins on the vertical row will not be actuated. These contacts represent the combination of the faulty character to be erased, they are used after translation by a set of relays for actuating backwards the line counter by a number of units corresponding to the width of said faulty character. The feelers are maintained in their normal position against an abutment 145 by a spring (not shown).

To erase an erroneous character the first rotation of the shaft 146 is followed by a second rotation clockwise and this rotation drives, through a linkage (not shown), the lower shaft 147 which moves to the left a plate 148 (see Fig. 18). This plate 148 is rotated by the same device which has been described above comprising two sliding sleeves 136 and 149 (Fig. 16) provided with studs 150 acting on studs 151 mounted on the plate. This latter plate bears seven hooks 152 adapted to engage notches in the sliding pins so that, when the plate is displaced towards the left, these hooks will find in their way the depressed pins of the vertical row corresponding to the character to be erased. They will therefore return all these members to their idle position, so that a new combination may replace the erroneous one.

The plates 139 and 148 are returned to their rest position by springs 153 and 154 respectively and are held between the plates 140 and the sleeves 136 and 149, so that they follow all the movements of the platen.

The mobile assembly 98 actuates the odd pins while the even pins on which the preceding line has been registered cooperates with the assembly 100, as said above, and, at the end of each line when the typewriter platen and the scanning carriage have returned to their initial position, a rocking motion takes place so as to place the assembly 98 opposite the even pins, such as 113, 115, 117, 156, 158, 160 and 162 while assembly 100 is brought opposite the odd pins such as 112, 114, 116, 118, 157, 159 and 161.

The scanning carriage 119 is moved one step during each idle cycle of the matrix drum by actuating the escapement 163 cooperating with the rack 164 rigidly connected to the scanning carriage and constantly solicited by a spiral spring enclosed in a casing 165 acting on a cord 166 through deflecting rollers 167 and 168. A series of seven contacts 125 cooperate with the decoder and are mounted on the scanning carriage 119; they are actuated by feelers 126 provided each with a tail 170 which is rocked when it meets on its path a protruding pin, that is to say, a pin in operative position. The feeler shown in Fig. 19 is opposite a pin in operative position and its associated contacts are therefore operated. When this feeler arrives opposite a pin in the idle position, it remains in its rest position shown in dotted lines under the action of a spring 171 pressing it against an abutment 172. The seven feelers may rock freely on a vertical rod 173 but are displaced with this rod when it slides axially in the bearing 174 of the scanning carriage, so that the feelers may be brought opposite one or the other row of pins. This displacement of the rod 173 is caused by a flat bar 175 (Fig. 16) engaging a notch formed in this rod, which is displaced alternatively upwards and downwards after the completion of a line. A resetting hammer 176 pushing all the pins at the same time into their initial position is adapted to act on the vertical row of pins which has been previously scanned by the feelers 126. This hammer is preferably made with a flat piece guided in the comb 177 and displaced rapidly to the left as soon as the scanning carriage has moved one step. Shafts 178 control this resetting hammer pivoted and supported by two levers 179 integral with sliding sleeves provided with keys so as to be rocked when the shafts rotate under the action of an electromagnet (not shown) similar to electromagnet 131. Levers 179 are guided by the flat members 180 fixed on the scanning carriage and compel the hammer to follow the movement of this carriage.

In order to be able to change easily and simultaneously the position of assemblies 98 and 100 at the end of each line, these assemblies, except the scanning carriage, are supported by the shafts on which they slide, said shafts being journaled on arms 181 and 182 which form a part of a rocking frame, so that the lower arm 181, for instance, may occupy either position 183 or 184 (Fig. 21). The rocking movement must not occur before the typewriter platen and the scanning carriage are returned to their initial position beyond the last vertical row of pins, so that the opening 106 of the assembly 98 and the feelers of the assembly 100 can move freely up and down without meeting the pins in their path. The rocking movement is initiated mechanically and automatically by the platen of the typewriter and at the correct instant by the device shown in Fig. 21 (Sheet 19). A lever 185 is pivoted on a fixed pin 186 and pressed by a spring 187 against a cam surface 188 fixed on the typewriter platen, a part of which is schematically represented in 189. A second lever 190 is pivoted in 191 on the lever 185 and provided with a roller 192. It is constantly urged into dotted position 193 by a centering device comprising a spring 194 cooperating with a stud 195 fixed on the lever 190 and the tail of the lever 185. A flat member 196, shaped like a wedge, is fixedly mounted on an arm 181 so that the tip of the wedge shaped part of the member 196 will lie either on one or the other side of line AA (Fig. 17), according to the position of the arm 181.

Assuming that the different parts are positioned as shown in full lines in Fig. 21 at the end of a line, during the return travel of the platen, the cam surface 188 will meet the end of the lever 185 on its path and this lever will rock clockwise against the spring 187 until it reaches the dotted position 197. The second lever 190 is then liberated from the action of the inclined edge of the wedge shaped member 196 and returns to its initial position 193 with its associated roller which goes into position 199. When the platen continuing its travel, carries the cam surface beyond the point 198, the lever 185 will be suddenly rocked counterclockwise by the spring 187 and the roller passes from the position 199 to dotted position 200 under the action of the cam surface of one side of the member 196. This member will be rotated clockwise around the shaft 201 and with it the arm 181 which will pass from the position 184 to dotted position 183. When, during its displacement when the next line is typed, member 188 finds the lever 185 on its path, this member rocks clear of this lever, since said member is pivoted on pin 202, and is returned to its initial position by a spring not shown.

This register presents many advantages over previously known registering devices. In particular it necessitates only a few mobile parts, as seven hammers and seven feelers, a line may be registered while another one is being scanned independently and the typewriter speed not reduced. Tabulation stops of the typewriter may be used in the conventional manner.

A modified registering surface is shown on Figs. 22 and 23.

This surface is formed in very thin metallic plate 141, preferably in metal of great elasticity. A number of strips such as 146 are cut in this plate, each of these strips replacing one of the sliding pins 102 described above. The plate is machined so as to give to each strip a length slightly greater than that it had before machining, so that each strip has two stable positions, either position 146 or position 152. A slight pressure on the strip makes it snap from one to the other position by elastic deformation. One position may be operative and the other one idle, for instance, it may be assumed that all the strips such as 152 are in the operative position and all the strips such as 146 are in the idle position. A section along line a—a of Fig. 22 is shown in the left of Fig. 23 to show more clearly the two alternate stable positions of each strip. On the right of this figure is schematically shown a preferred method of forming each strip. According to this method, narrow elongated slots such as 155 are first cut in the sheet metal blank, and then, the intermediate supporting strip is permanently distorted, in order to decrease its length, and in the same time increase the length of the active strips 146—152. The outstanding advantage of this modified register is its simplicity and light weight which makes it possible to use it on the form of a record strip.

*Decoder*

When a line has been typed on the typewriter and this line stored in a register the operator actuated the key controlling the return of the platen. In the same time the register is severed from the typewriter and connected to an escapement mechanism. It will then move step by step and present successively all the code combinations of the letters of the stored line opposite contacts 125 (Fig. 18). The register carriage moves one step for every two revolutions of the master disc or drum, during the "stepping cycle," that is to say, when no photography is made.

Contacts 125 (Fig. 18) are actuated by the pins of the register and associated with a decoder, the purpose of which is to trigger the flash tube when the selected letter—corresponding to the code combination of the pins—passes in photographic position.

Several different types of decoders may be used, one with electromagnetic relays, and others with cams controlling selective circuits which open or close a circuit when the selected character passes in photographic position. In this case the control circuit is closed or opened too short a time to operate a mechanical device and an electronic arrangement is used.

Fig. 24 shows an example of a decoding circuit using telephone relays. Each of the seven contacts 125 of the register (Fig. 16) operates one of a set of relays 203, 204, 205, 206, 207, 108 and 209. For example, the contacts of the first four pins of the register are connected to wires 210 and operate relays 203, 204, 205 and 206, while the contacts of the three last pins operate relays 207, 208 and 209 through wires 211.

Relay 203 is provided with only one change-over contact spring cooperating with a make-and-break contact respectively connected to a change-over spring of the second relay 204, and so on. Relay 206 is therefore provided with sixteen contacts. Each of the contacts of relay 206 corresponds to a combination of the first four pins of the register. If for example, as shown on the drawing, relays 203 and 205 only are operated the ground 212, connected to the spring of the first relay, will appear on contact No. 6 of relay 206. The first fourteen contacts of this relay 206 are connected to fourteen terminals 213 imbedded in an insulating disc 214. Contacts No. 15 and 16 are allocated to auxiliary controls as will be explained later.

Relays 207, 208 and 209 are connected in cascade as relays 203—206. Relay 207 is provided with two change-over contacts and relay 209 with eight break and eight make contacts. These eight contacts are connected to eight brushes 215—222 mounted on insulating discs 223, 224 (see Fig. 25) by means of connecting discs 225 separated by insulating washers 26. These brushes revolve with shaft 227 rotating in bearing 228 in the direction of the arrow, (see Fig. 24) and synchronously with the master character drum. In one revolution of shaft 227 each brush makes contact with all the terminals of disc 214. The brushes and terminals are arranged in such a way that no more than one brush at a time can be on the center of a terminal.

If, for example, as shown in Fig. 26 the brush 215 is on the center of the terminal 229, when the shaft 227 has moved an angle α brush 216 will be on the center of terminal 230. After a displacement 2α brush 217 will be on the center of terminal 231 and so on. Angle α is the angle separating, on the disc or drum, two consecutive characters, in other words it is the angle through which it is necessary to move said disc or drum to bring successively two characters in front of the lens. Therefore each time one of the brushes 215—222 is on the center part of one terminal 229—242 a character of the master character drum is in photographic position. It is also when one brush passes over the center of a terminal that a light impulse impinges the photocell 20 (Fig. 3). In the example shown only fourteen out of sixteen contacts of relays 203—206 are used. These terminals in combination with eight brushes give 14×8 i. e. 112 possible combinations.

When one terminal 229—242 has been selected by the chain of relays 203—206 and one brush 215—222 by the chain of relays 207—209 a circuit will be closed when the selected brush reaches the selected terminal and this circuit will remain closed as long as the brush is in contact with the terminal. It is during this time interval that occurs the precise photoelectric impulse which will trigger the flash tube. For example, in Fig. 24 the terminal selected is that corresponding to contact No. 6 of relay 206 and is therefore connected to the ground. The brush selected is brush 222 since all the relays 207—209 are at rest. When brush 222 reaches the terminal 234 the ground will be momentarily connected to the control wire 215 which transfers it to the trigger circuit as will be explained later. The control impulses generated by the photocell can trigger the flash tube only when the following circuit is closed: contacts of relays 203—206, terminals 229—242, brushes 215—222, contacts of relays 207—209. In this case a ground is connected to the control wire 216 and is used to provide a way to the corresponding photoelectric impulse as will be explained in relation to Fig. 36. A cam 243 is provided to disable the control wire of the flash circuit every other revolution of the brushes 215—222. It is during the idle cycle, when cam 243 opens its contacts, that a new combination of the register is connected to the decoder.

The decoder disclosed in Figs. 24, 25 and 26 comprises relays which have an appreciable operating time, of the order of ten milliseconds, and which also need some maintenance. Although the division of the decoding relays in two chains reduces the number of relays and the importance of the wiring and the number of contacts it involves a certain amount of equipment. Figs. 27 to 35 show decoders in which no relays are used and that operate instantaneously. Furthermore these decoders require only a reduced amount of equipment.

Figure 27:
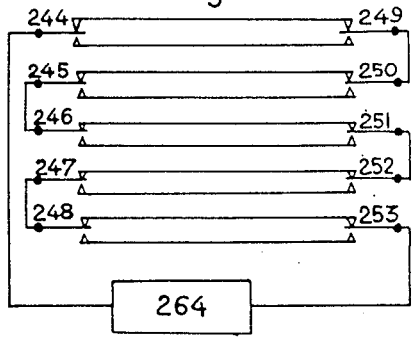
Figure 30:
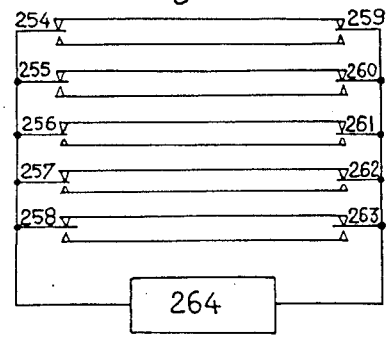

The basic circuits involved in the operation of these decoders is shown in Figs. 27 and 30.

Referring to Fig. 27 the code combination stored in the register is represented by contacts 244 to 248 which, according to the combination involved are either on their initial or their operated condition. The number of possible combinations is, as has been explained previously equal to $2^n$, where $n$ is the number of elements of the code. The circuit shown in Fig. 27 is for a five element code but may be extended immediately to any number of elements. As a matter of fact, as will be shown herebelow, a code of six elements is usually necessary in printing work. If the contacts of the register are connected as shown at the set of contacts 249 to 253, it is clear that the circuit will be closed only when contacts 249 to 253 are on the same positions as are contacts 244 to 248. If therefore, by a set of cams, these contacts are made to assume successively all the positions corresponding to all the possible combinations, the circuit will be closed when they assume the same combination as contacts 244 to 248.

Figure 28:

Fig. 28 shows schematically the arrangement of such a set of cams. In this figure the recesses of the cam are shown in white and the protubering portions in black. It may be seen that when the cam revolves all the thirty-two possible combinations are successively established.

Figure 29:
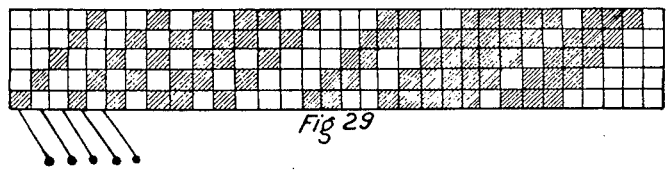

Any order of occurrence may be chosen for the combinations on the cams, but if the order shown in Fig. 29 is adopted, it may be seen that the five cams are identical and staggered one step. They may be therefore replaced by a single cam and five sets of staggered contacts as shown on the side of Fig. 29.

The use of cams and springs has the drawback of generating vibrations and when the speed is increased the contacts have not sufficient time to be established correctly. It is possible to replace the set of contacts controlled by cams by brushes wiping sectors alternatively conductive and non-conductive. A simpler embodiment however is to open a control circuit rather than to close it as in the case of Fig. 27. The basic circuit involved in this case is shown in Fig. 30.

In this figure the contacts of the register are shown in 254—258. All the movable springs are connected in parallel and to one terminal of the control circuit 264. Springs 259—263 are also connected in parallel and to the other terminal of the control circuit 264. It may be seen that the circuit shown will always be closed unless the combinations of contacts 259—263 be exactly the same as that of contacts 254—258.

Fig. 31 shows an embodiment of such a decoder. Two metal wheels or discs 265 and 266, shown apart to facilitate the comprehension but in fact mounted on the same shaft (which is also the shaft of the master character drum or disc) are connected to one terminal of the control circuit 264 of the flash tube. The other terminal of this circuit is connected to contacts 267—271 of the register 272. These wheels are provided with insulating portions shown in black, the conductive portions being shown in white. These insulating portions are arranged as shown in Fig. 29 for one wheel and reverse for the other one. It may be seen that the circuit will be open if springs 270 and 271 of the register are operated in the case of the drawing. For any other register combination there will be at least one brush in contact with a conductive portion and the control circuit 264 will remain closed.

Figure 32:
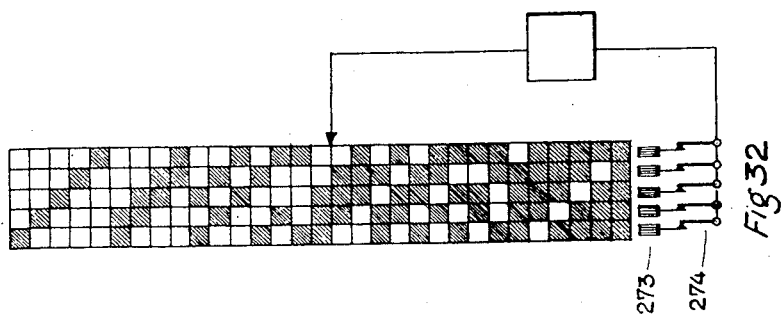

Fig. 32 shows an alternative arrangement in which five discs are used instead of the two discs 265 and 266 of Fig. 31. The conductive parts are shown in white and the insulation in black. The five brushes 273 are connected to the register contacts 274. These contacts are no longer change-over contacts as previously but only make contacts. It may be seen in the drawing that the circuit will be open for the first time in a revolution when the brushes pass over the same combination as that of the register contacts 274, since the combinations are arranged in increasing order of insulating parts. Afterwards the brushes will pass over combinations comprising a larger number of insulated parts and the circuit will be again open. It is therefore necessary that only the first opening triggers the flash tube. To this effect the supply of the flash tube must be cut off after it has first been operated. This is a condition easily met especially when the photographic unit operates at every other revolution, the second revolution being an idle one during which the film carriage and the register move to their next positions. It is sufficient to open the supply circuit of the condenser of the flash tube for the duration of the photographic cycle. The condenser is charged during the idle turn. To this effect an electronic tube is connected in the supply circuit of this condenser and negatively biased during the active cycle so as to make it unoperative until the next idle turn. Once this condenser has been discharged it remains discharged and inactive during the rest of the revolution.

Fig. 33 shows an embodiment of the circuit of Fig. 30 in the case of a standard typewriter keyboard with 42 keys and 84 characters. Fig. 34 shows a development of discs 275 and 276 where the insulating portions are also shown in black. As it has been explained in relation with Fig. 29 instead of using six discs only one is used with six brushes staggered one step apart. Six elements are used instead of five in Fig. 29. With six elements 64 different combinations are possible. In the present case only 42 are needed, 45 have been provided however and a dead angle is therefore available for control purposes.

Fig. 33 shows the two discs 275 and 276, the register contacts are shown in 277, each disc is provided with a double set of combinations, i. e. 90 altogether. At each revolution the circuit is therefore open twice for each combination by brushes 278 and 279. The seventh contact of the contact set 277, corresponding to the shift key of the typewriter cooperates with a disc 280 which is conductive on half of its periphery. According to the position assumed by this seventh contact the control circuit 281 will remain short-circuited during the first or the second half of the revolution. The first half is devoted to small letters for instance and the second half to capital letters.

These decoders have the advantage of operating instantaneously, they are ready as soon as the register contacts have assumed their new positions.

Fig. 36 shows how this temporary opening or closing of a control circuit may be used to select the photoelectric impulse generated by the selected character to actuate the trigger device.

Referring to Fig. 36 the photocell is shown at 282. This photocell is preferably of the vacuum type and the voltage variations across the load resistance 283 are applied by a condenser 284 and a resistance 285 to an amplifier tube 286, for instance one 6AC7 tube. The photoelectric impulses in the output circuit of this tube are of positive polarity and applied to a threshold tube 287. The grid bias and screen voltage of this tube are so adjusted that the impulses are below the threshold level and cannot therefore go through this tube 287. The impulse corresponding to the selected character is lifted above the threshold level of tube 287 by an impulse generated by the decoder.

It has been explained that the decoder closes or opens a circuit when the selected character passes in photographic position. This change in the state of the control circuit 290 is used to generate a broad impulse applied by condenser 288 and resistance 289 to the grid of the tube 287. The sharp impulse generated by the photocell 282 is then transmitted to the grid of the amplifier tube 291 and appears in the plate circuit of this tube as a positive impulse. This positive impulse is used to trigger the flash tube 292. Several circuits may be used to this effect. For instance this impulse is applied to the grid of a thyratron tube 293 and causes condenser 294 to discharge in the primary winding of the transformer 295. A high voltage is generated in the secondary winding of several thousand volts and applied to the triggering electrode of the flash tube 292. The flash tube is primed by this impulse and a condenser 296 charged at a high voltage by a rectifier 297 discharges into it with an intense luminous flash.

Fig. 37 shows how the impulses are generated by the photocell. On line 298 are shown different widths of the luminous line projected on the disc, on line 299 the width of the transparent slit of the master sheet (23 in Fig. 3). On line 300 are shown the variations of the luminous flux falling on the photocell and the resulting current. On line 301 this current is shown after it has been differentiated, for example, by a circuit comprising a small condenser and a resistance. In the case of the left hand side of the figure the width of the luminous line is greater than that of the slit, two impulses are obtained of approximately rectangular shape. In the example in the middle of the figure the luminous line has the same width as the slit, the two impulses are side by side. In the case on the right hand side the luminous line is narrower than the slit, the amplitude of the pulses is then reduced. Actually the shape of the impulses differs somewhat from the theoretical shape given in line 301. Line 302 shows the impulses as they appear on the screen of an oscilloscope.

Sensitized surface carriage

The sensitized surface on which the different characters previously registered are projected in order to make up lines is preferably in the form of a film provided with perforations engaging the teeth of sprockets.

The film is moved sideways after each character is printed and the extent of this displacement varies according to the width of the characters, and also according to justification. After the completion of a line, the film is moved lengthwise.

According to one feature of the invention the sensitized surface or film is supported by a carriage unit comprising two carriages, a light one which advances intermittently and a heavier one which advances independently and preferably in a continuous fashion. The first carriage bears only what is necessary to the photography of the line, the other one bears the supply and take up spools.

This arrangement has many advantages originating in the fact that the carriage which is displaced during the stepping cycle after a character has been photographed is very light. The total duration of this stepping cycle cannot be devoted entirely to the advance of the film carriage, since a certain time is required for the operation of the register which must move onto the next combination. The scanning carriage of the register remains stationary until the film carriage has begun its displacement. Taking into account the operating time of the width translating relays and the time necessary to allow the vibrations to damp out before the next photographic cycle, it may be assumed roughly that the film carriage must begin and complete its displacement in $3/10$ of a cycle. This is why the first film carriage must be as light as practically possible in order to be rapidly set into motion and stopped without too much jerking. The heavier carriage may on the contrary be displaced in a continuous fashion at an average speed three times less than that of the light carriage. A timing diagram of these displacements is shown in Fig. 38. The upper line shows the time devoted to the displacement of the light carriage, the lower line that of the heavier carriage. The drawing indicates three revolutions of the master character drum.

A certain amount of relative independence between the two carriages is obtained by means of loops in the film. The two carriages may be connected together as shown in Fig. 39 by a cord 302 connecting the light carriage 303 to the heavy carriage 304 by the intermediary of a spring 305. Thus the intermittent displacement of the light carriage is transformed into a relatively constant motion. The intermittent displacements of the carriage 303 are controlled by a variable escapement mechanism 306. In Fig. 40 the two carriages are displaced absolutely independently, carriage 303 moves under the control of a variable escapement mechanism 306, whilst the heavy carriage 304 is controlled by an ordinary escapement through a resilient coupling 328. The escapement 307 operates at a sequence adjusted to give to the heavy carriage an average speed approximately equal to that of the light carriage.

In the embodiments shown in Figs. 43, 41 and 42 the light carriage 303 comprises a plate of light material such as plastics or a light metal, such as magnesium, provided with four knife-edged rollers 326 travelling in grooved cuts in bars 308. The upper rollers are preferably pressed against the upper bar or rail by springs (not shown) in order to reduce the play and to apply continuously the lower rollers against their rail. The bars 308 are fixed on a frame 309 mounted on the main base 310, on which the heavier carriage frame 311 is also secured preferably with resilient or shock absorbing means.

The sensitized film is continuously pressed against a finely polished gate or window 312 secured on the frame of the light carriage, by a presser 313 on which act springs 314. The independence of the light carriage relatively to the heavy carriage is secured by two S shaped loops 315 and 316 formed by the film before and after its passage under the presser. Guides 317 help to give these loops the proper shape. A plurality of guides 318 is provided to maintain the film and prevent it from disengaging from the teeth of the feed sprockets. The sprockets 319 and 320 are rotated during the return movement of the carriage for line spacing. One of these sprockets, for instance 320 (Fig. 43) is preferably adjustable along a sleeve 321 to make its adjustment possible according to the width of the film used. Sleeve 321 can slide along a square shaft 322 so that any rotation of this shaft will drive the sprockets and advance the film. The extent of this rotation is controlled by means not shown in order to adjust the line spacing to the desired value and which act on one end of shaft 322, preferably outside the light tight casing (not shown) in which both carriages are placed. The sprockets 323 and 324 are driven simultaneously by suitable means, such as a chain, and to the same extent as feed rollers 319, 320 in order to maintain the same amount of slack in the loop of film.

The film is fed from supply spool 325 mounted on carriage 304, passes around the auxiliary feed sprocket 323, forms a loop and passes around the roller guide 327, then under presser 313, forms a second loop and returns to carriage 304, passes around the auxiliary feed sprocket 324, and is wound on the take-up spool 329.

Carriage 303 is permanently urged in one direction by spring 330 as an ordinary typewriter platen, the extent of its displacements are controlled by a variable escapement mechanism acting through a convenient gearing and a rack 331 secured to the carriage. A speed changing mechanism (not shown) is preferably connected between the variable escapement mechanism and the rack, said speed changing mechanism being controlled by the lens turret of the photographic unit. Its purpose is to adjust the displacement of the carriage to the sizes of the characters. In order to minimize shocks, carriage 303 is preferably provided with a speed limiting device. When the line has been entirely photographed, both heavy and light carriages are simultaneously returned to their initial positions by a cord actuated by a clutch and a drum.

Variable escapement mechanism

The driving shaft of the speed changing mechanism controlling the displacement of the sensitized surface carriage is keyed to a variable escapement mechanism comprising mainly a toothed wheel advancing the driving shaft one, two up to eight or more teeth. The wheel 333 shown in the embodiment of Figs. 43 and 44 is provided with forty-four teeth and rotates in a hole punched in a fixed plate 334 through which is fitted a sleeve 332 fastened to wheel 333. The wheel tends to rotate in the direction of the arrow under the action of a spring preferably acting directly on the member to be moved, for instance, the sensitized film carriage. This spring is not visible in Figs. 43 and 44. Wheel 333 is restrained from rotating in the direction of the arrow by a fixed stop 335 arresting the arm 336 of a mobile X-shaped member 340, the opposite arm 338 is provided with a tooth 339 engaging wheel 333 to maintain it against the action of the driving spring. Member 340 is preferably composed of a central part, pivotally mounted on a pin 341, forming arms 338 and 336 and on which are fixed the two other arms 342 and 343, for instance blanked out of sheet metal. In the position shown in the drawing, the mechanism is at rest since wheel 333 cannot rotate. Pin 341 on which is rotatably mounted the X member 340, is fixed to plate 344. This plate can be rocked on a hinge formed by a rod 345 and two ears 337 of the frame plate 334. The plate 344, when not actuated, is constantly maintained in the position tending to engage a tooth 339 between two teeth of wheel 333 by a spring 346 mounted in the hinge 347. The plate 344 is formed at one end with a deflecting portion 358 on which is pivotally mounted a pawl 348 rotating on a pin 349. This pawl is constantly maintained against a stop 350 by a spring 351. When the escapement mechanism is at rest, as shown, wheel 333 is clear from pawl 348. The other end of plate 344 is provided with a tail 352 which is oscillated to rock the plate 344 against the action of spring 346.

The frame plate 334 is secured by spacers 353 to the main frame of the mechanism. This frame comprises plates 354, 355 and 356. Electromagnets 357, in the same number less one as the number of positions of the variable escapement, are placed between plates 354 and 355. These electromagnets are preferably arranged around pivot 341 at appropriate positions to control the displacements of member 340 of the corresponding number of teeth. Each electromagnet is provided with a plunger comprising a magnetic core 359 and a non-magnetic projecting portion 360. When the escapement is at rest, all the plungers are retracted clear of the path of member 340 by springs 361 maintaining them against plate 356. Member 340 is urged in the opposite direction from the arrow by spring 362 mounted around pivot 341, but this movement will not take place as long as member 340 is maintained by wheel 333 since spring 362 is much weaker than the spring tending to rotate wheel 333 in the opposite direction.

The operation of the escapement mechanism will now be set forth.

When it is desired to move the escapement a number of steps, the electro-magnet corresponding to this number of steps is selectively operated, for example by a width translator (see Fig. 46). In the example shown, seven electromagnets are provided adapted to give eight different possible displacements, the eighth and longest displacement is controlled by a fixed stop. It is clear from the above that the angular displacement of wheel 333, subsequent to displacement of member 340, is the same as that of said member. Two electromagnets are adapted to stop arm 336, two other arms 342, two other arms 338, and finally one electromagnet and the fixed stop arm 343. If, for example, it is wanted to rotate the wheel one tooth, the corresponding electromagnet will be energized and the associated stop pin projected above plate 354, in the path of arm 336. The X-shaped member will be liberated from the restraining action of wheel 333 when the plate 344 is rocked in the direction of the arrow by appropriate means, for instance another electromagnet, tooth 339 is cleared from wheel 333 at the same time as pawl 348 engages this wheel to maintain it at rest. As soon as member 340 is liberated from the restraining action of the wheel, it begins to rotate in the opposite direction to the arrow under the action of spring 362. This rotating motion is stopped by the pin it finds in its path, in the example chosen, one tooth apart. As soon as the force rocking plate 344 is released this plate returns to its initial position under the action of spring 346 and pawl 348 clears wheel 335 at the same time as tooth 339 engages said wheel. The latter wheel, as soon as it is liberated from the restraining action of pawl 348, rotates in the direction of the arrow, driving with it the X-shaped member 340 and arm 336. Both wheel and arm on the completion of the displacement are arrested by the fixed stop and the mechanism remains at rest, ready for a new operation. In the figure stop 363 is positioned, to arrest when actuated, the arm 336 at such a position that tooth 339 engages the wheel five teeth apart from the position shown in the drawing. Stop 364 controls the three teeth escapement, stop 365 the seven teeth, and so on.

In order to make it possible to return the film carriage without disengaging its rack from the associated variable escapement mechanism, pawl 348 is pivoted on pin 349 and constantly pulled against a step by spring 351. When the wheel 333 is to be rotated in the reverse direction, the pawl is first engaged by the wheel by rocking plate 344 and operates then as in a typewriter.

The outstanding advantage of this mechanism is that it can be adjusted in advance for a given displacement. For instance the electromagnets actuating stops such as 360 may be energized during the photographic cycle and plate 344 also rocked during this cycle. The X-shaped member 340 will then be in a position to let the wheel escape a certain number of teeth according to the width of the letter which has been photographed. This feature makes it possible to initiate the displacement of the carriage as soon as the photographic cycle is over, it leaves more time for this displacement since no time is lost in the preparation of the movement. Moreover, since the displacement takes place immediately, the electromagnet controlling the selection stop may be deenergized as soon as wheel 335 has started its movement. This feature is of value since it is thus possible to liberate the register sooner. The scanning carriage of the register may be moved almost immediately after the photographic cycle is over to prepare the circuit for the next character.

*Selective advance translator*

As it has been explained the film carriage is moved selectively after a character has been photographed according to the width of said character. A chain of relays is used to actuate the selection stops of the variable escapement mechanism which has just been described. These relays are controlled by the register contacts. When the register moves one step, it prepares a new circuit for the decorder controlling the exposure and operates the translator relays.

Fig. 46 shows the circuit of this width translator. The register pins are shown at 366 and the seven associated contacts cooperating with the lower or odd pins on which the combination of the character to be printed is recorded. On one side wires 310, 311 are connected to the decoder and on the other side to relays 375—381. Pins 367—372 control relays 375—380, pin 373, which corresponds to the "shift" key controls the operation of relay 381. When relay 381 is at rest it switches the control wire 383 to the right contacts and to the left contacts when it is operated.

The combinations of the various characters are so chosen that the characters of same width have in common a sub-combination of the code elements. Whenever this sub-combination is present in a character combination the corresponding electromagnet of the variable escapement mechanism 382 is energized. For instance, it may be seen on the drawing that in the case of small letters, when relay 381 is at rest, whenever relay 375 is operated control wire 383 is connected to terminal No. 3 of the variable escapement mechanism. Relay 375 is operated for all combinations in which stop pin 382 is involved, whatever may be the other elements of the combination. When control wire 383 is energized the film carriage will move three length units.

The same control wire No. 3 will be operated for capital letters having the following combinations: relays 375, 376, 378, 379 at rest, relay 380 operated, relays 375, 376, 378 at rest, relay 379 operated.

It may be seen that there may be thirty-two small characters of width 3 since relay 375 is followed by five more relays. On the contrary in the examples given for capital letters the first sub-combination can control only one character since it leaves the last relay of the chain, the second combination can control two characters, since in this case control wire No. 3 is connected to the penultimate relay 379 of the chain. In the examples shown there may be therefore 32 small letters and three capital letters of width 3.

It is possible by this simple chain of relays to control all the stop members of the variable escapement mechanism 382. Cams 384 and 385 are used to time the operation of the escapement. Cam 384 is closed first to actuate the selection pin while the machine is still in the photographic cycle, cam 385 is closed as soon as the photographic cycle is over and operates the motor magnet 386. Cam 384 is released shortly after cam 385 in order to avoid any false operation due to a premature release of the stop pin.

It may be seen that, when no relay of the chain is operated control wire No. 3 of variable escapement 382 is connected to cam 384, that is to say, that a width of three units is allocated when there is no character recorded in the register. This may be used in relation with tabulation. The same device may be used to control the line counter.

*Justification*

The minimum value of the interwords must be increased if, as customary in the printing art, both margins are equalized, or in other words, the lines justified. According to the present invention this result is obtained in a very simple manner by the use of apparatus employed for other purposes in automatic telephony. According to the method used, the line is stopped a little before its length reaches the "justification" leaving a "remainder" D as shown at 387 in Fig. 47. This remainder D is distributed between the words separated by an interword 388. This remainder D may be expressed in elementary length units, and the division of this number of units D by the number of interwords "$n$" by equation $$q \times n + R = D$$

where "$q$" is the quotient and "$R$" the rest of the division.

When the remainder D is divided exactly by the number of interwords $n$, R is equal to zero. In this case each interval 388 is increased by the same number of elementary intervals $q$, but when this division cannot be made exactly, that is to say, when there is a rest R, this rest R must be exhausted by distribution among the interwords.

The graph of Fig. 48 makes clear how this rest R is distributed. Any line which has not yet been justified is characterized in the graph by two coordinates, the remainder D in abscissae and the number of interwords $n$ in ordinates. Thus, point 1—4 represents a line one unit too short with four interwords, point 7—4 a line seven units too short with four interwords, and so on.

It may be seen on this graph that the locus of the lines for which the remainder is exactly divisible by the number of interwords are straight lines. For instance, the points representing lines 1—1, 2—2, 3—3, 4—4, 5—5, 6—6, 7—7, 8—8 and 9—9 to which one unit must be added to each interword are on a straight line. This is also the case for lines which need two units by interword, 2—1, 4—2, 6—3 and 8—4, those needing three units by interword 3—1, 6—2, 9—3. Since the graph has been limited to lines with a maximum of nine interwords and a maximum remainder of nine units, there are only isolated points for the other lines. These locii are used to divide the plane of the graph as shown in Fig. 48 in a number of different zones, 389, 390, 391, 392. Zone 389 includes all lines which need at most one unit for each interword, zone 390 those needing at most two units for each interword, zone 391 those needing at most three units, etc. We shall call zone 389 the one unit zone, zone 390 the two unit zone, zone 391 the three unit zone, etc. Let us now consider the representative point of a line with, for instance, a remainder of seven units and four interwords. This is point 7—4 and it lies in the two unit zone, and the three consecutive points to the left on the same horizontal line are also in this zone. If we add to the four successive interwords additional length units characterized by the zone in which they lie, it may be seen that the line is exactly justified. In the example chosen, the first point 7—4 lies in zone 2, the second point 6—4 in zone 2, the third 5—4 in zone 2, and the fourth one 4—4 in zone 1, and the following additional unit will be added: first interword two units, second interword two units, third interword two units, fourth interword one unit, making altogether 2+2+2+1=7. This line is justified.

It may be checked that this applies to any representative point of the graph. For instance, a line with a remainder of one unit and four interwords is represented by point 1—4, an additional unit will be added to the first interword only. A line five units too short with two interwords is represented by point 5—2 lying in zone 3. A first three units will be added to the first interword, two units to the second interword, making a total of five.

The graph of Fig. 48 may be drawn in polar coordinates as shown in Fig. 49 with an equivalent procedure.

There are several possible embodiments of mechanism for carrying out the method described above, mechanical and electrical. These embodiments may be based on the rectangular or polar graphs. A mechanical embodiment is shown in Fig. 50.

Referring to Fig. 50, the different zones of graph 48 are embodied in a cylinder 393. This cylinder rotates about an axis 394 and controls the displacements of a rod 395 which controls the number of additional units added to the interwords at the justification stage. The displacements of rod 395 are determined in the following manner. First cylinder 393 is, before the line is to be justified, rotated so as to bring opposite to rod 395 the representative point of the line which is to be justified. This is made by rotating the cylinder a number of steps equal to the number of units contained in the line, from a starting point depending on the desired "justification." Second, the cylinder is moved slidably along its axis 394 a number of steps equal to the number of interwords. Zones of different depths, according to graph of Fig. 48, are provided on cylinder 393, so that the possible displacement of rod 395 is in accordance to the number of elementary length units to be added if the cylinder is moved one step after each interword.

It is clear that other mechanical embodiments may be used in plane or cylindrical form with polar or rectangular coordinates. They are not described here since they are considered for the purpose of the invention as equivalent.

A preferred embodiment in which telephone switches are used will now be described, in relation with Figs. 51, 52 and 53.

Fig. 51 shows schematically a switch comprising as many terminal rows 396, numbered 1 to 10, as there may be interwords in a line, at most ten in this case. Each of the rows may comprise as many terminals as there may be elementary length units to distribute to complete the line, twenty in the case of the figure. Cooperating with these terminals are as many brushes 397, numbered 1 to 10, as there are different rows of terminals, these brushes, which move simultaneously, wipe successively the terminals. The terminals are connected together so as to build up the zones of Fig. 48 as follows: terminals of row No. 2, two by two; those of row No. 3, three by three; those of row No. 4, four by four, and so on. The different groups in each row are then connected to the corresponding groups of the other rows as shown, beginning with the left hand side.

Each of the zones so constituted is connected to one control electro-magnet of the variable escapement mechanism of the film carriage to operate it when needed. The first zone is connected to the electro-magnet corresponding to a displacement of one unit, the second zone to that controlling the displacement of two units, and so on. There are in the drawings eight such magnets 398, numbered 1 to 10.

Brushes 397 are, on the other hand, connected to the terminals of another switch provided with as many terminals as there are brushes 397, that is to say, ten in the example shown. The brush of this switch 399 moves one step every time the operator depresses the spacing bar for an interword and thus counts the number of interwords from its initial position 400. When the line is completed this brush selects the brush 397 corresponding to the number of interwords in the line and connects it to the positive terminal of a battery. For example, a line with five interwords and nineteen units too short. As it has been explained above, brush 399 will stop on the position shown in the drawing and brush 397 No. 5 energized. On the other hand, this brush is in contact with terminal No. 19 of terminal row No. 5 as shown in dotted lines, since brushes 397 are adapted to move every time a character is typed by a number of steps corresponding to the width of said character, and their starting point from their initial or zero position is determined by the desired "justification." When the line is typed, they are therefore at a distance D steps from their 0 position. When brush 397 No. 5 will be first energized, it will therefore operate electromagnet 398 No. 4 and cause the film carriage to move four supplementary steps after the first interword. In the same time brushes 397 move one step to terminal 18, and for the second interword they operate electromagnet 398 No. 4 again since terminal 18 is also in zone 4. Brush 397 No. 5 will thus be successively in contact with terminals 19, 18, 17, 16 and 15. Terminals 19 and 16 are connected to electromagnet 398 No. 4 and terminal 15 to electromagnet No. 3 so that the following additional units will be added:

$$4+4+4+4+3=19$$

The lines are thus justified with a maximum difference of one unit length between any interwords, and this is hardly noticeable.

It is clear that it is possible to use different types of switches to obtain the results as explained above. It is possible, for instance, to combine switches 399 and 397 in a single switch well known in the telephone art as selector switches and are considered as equivalent elements for the purpose of the invention.

The operation of the justifier in relation with the other units of the machine will now be described in relation to Figs. 52 and 53.

The switches disclosed in Figs. 52 and 53 are of the type known as step-by-step switches. The two fingers are to be considered simultaneously for a better understanding of the mechanism. For the sake of simplicity the different rows of terminals of the various switches have been shown side by side or one above the other, but it must be clear that the brushes of the same switch rotate simultaneously when the stepping magnet is energized.

The embodiment, as shown, comprises essentially:

1. A step-by-step line counter 401 provided with two brushes 402 and 403 cooperating with the typewriter. This switch moves every time a character has been typed by a number of steps equal to the number of length units in the said character and counts therefore the length of lines before justification.

2. Two step-by-step switches or interword counters, of which only one 404 is shown, since these counters are alternately connected to the keyboard and the justifier. It is also possible to use one switch to set up the other one on the desired position, when the line has been completed, this other switch being permanently connected to the justifier.

3. The justifier proper comprising several step-by-step switches. The number of switches used varies according to the maximum value of the remainder and the number of interwords. Each of them is provided with as many terminals as there are length units in the remainder D. In the embodiment shown in Figs. 52 and 53 the justifier switches are shown in 409, 414 and 419, each one provided with four brushes 410, 411, 412, 413 for switch 409, 415, 416, 417, 418 for switch 414 and 420, 421, 422, 423 for switch 419. The three last brushes of each selector are shown on Fig. 53.

The terminal rows scanned by brushes 410, 415 and 420 of the justifier are multiplied together and with the terminal row of switch 401 swept by brush 402. The terminal rows swept by brushes 411, 412, 413, 416, 417, 418, 421, 422, 423 of the justifier switches are wired as explained in relation with Fig. 51. Brush 408 of switch 404 (Fig. 53) operates in the same manner as switch 399 of Fig. 51.

The terminals swept by brush 405 of switch 404 are connected together, the first terminal 0 is left isolated and is the initial position of the brushes. The terminals of the rows swept by brushes 406 and 407 are connected in groups, each group comprises as many terminals as the justifier switches, such as 409, have justification rows, such as those swept by brushes 411, 412 and 413. These groups are equal in number to the number of justifier switches such as 409, 414 and 419.

As it has already been explained the line switch 401 is operated when the line is being typed so as to count the width of the characters. The starting position of brushes 402 and 403 of this switch is such that if the line has exactly the desired length or "justification," these brushes 402 and 403 reach neutral terminal 0 of the switch. The starting point of brushes 402 and 403 is chosen a number of steps from terminals 0 equal to the number of units or points of the justification minus one or several times the total number of terminals of the switch. These brushes are brought into position by means of an electrical commutator called "Adjust justification" 424. This commutator is provided with a conductive member 425 cooperating with a row of terminals, one for each possible justification, and such that only one terminal is left isolated such as terminal 7 on the drawing. These terminals, cooperating with member 425 are connected to the terminals of a control row of switch 401 and will cause this switch to stop when brush 403 reaches this isolated terminal, since the stepping magnet of this commutator switch is thus open.

The interword switch 404 moves one step whenever the spacing bar of the typewriter is depressed, so that its brushes, which at the beginning of the line were on terminal 0 are, when the line has been typed, at a distance from 0 equal to the number of interwords in the line. When the operator is warned by a signal that the line is nearly completed and stops typing, brushes 402 and 403 are on a terminal corresponding to the number of interwords. Brushes 406 and 407, on the other hand, make contact with terminals in the groups to which belong the justifier switch 409, 414 and 419 which correspond to the number of interwords. In the example shown each justifier switch is provided with a home return row swept by brushes 410, 415, 420 and three rows used for justification, 411, 412, 413—416, 417, 418 and 421, 422, 423. The terminals of switch 404 cooperating with brushes 406 and 407 are connected together three by three as shown on the drawing. Therefore for the lines comprising one to three interwords, switch 409 is operated, switch 414 for lines of four to six interwords, switch 419 for the lines of seven to nine interwords.

When a line has been typed on the typewriter and the operator has checked that there is no mistake, he depresses key 426 which controls the return movement of the typewriter platen. This key is maintained closed for a given length of time (by a device not shown) until the operations it controls have been completed. In the example shown key 426 connects the stepping magnet of the step-by-step switch 414 to the positive terminal of a battery through the following circuit: upper contact of key 426, back contact 428 of relay 427, brush 406, break contact of relay 430 and the ground. This stepping magnet will therefore operate, open its contact and fall back, thus causing its armature to move the brushes 415, 416, 417, 418 one step clockwise and so on until brush 415 reaches terminal 4 in the example shown, where it is stopped by the operation of relay 427 by the following circuit; battery, bottom contact of key 426, brush 402, terminal 4, brush 415, brush 407 and relay 427. Relay 427 operates and remains operated as long as key 426 remains closed. This relay opens contact 428 and stops therefore the stepping magnet 439 and brush 415 on terminal 4. On the other hand relay 427 applies a battery current to the stepping magnet of switch 401 through contact 429 of relay 427, member 425, brush 403 of switch 401, contact of magnet 401, winding of switch 401. This stepping magnet operates and drives brushes 402 and 403 of switch 401 until brush 403 reaches the terminal corresponding to the justification 7 in the drawing. The magnet stops since circuit is open by member 425.

It is seen that the operation of key 426 or a relay controlled by it, causes the following operations: setting of the justifier switch corresponding to the number of interwords in the line, return of switch 401 to its initial position.

The revolution during which the register moves has been called "stepping or idle" cycle in opposition to the photographic cycle or active cycle. When, after the last letter of one word has been photographed, the register moves to the next combination it finds the code combination corresponding to an "interword." This code signal is not used in the decoder but is selected in a chain of relays similar to the translator chain of Fig. 46. In fact additional contacts are provided to this effect in the chain of relays of Fig. 46. A relay is connected on the control wire corresponding to this interword code combination and when this relay operates it connects a ground to wire 431 and relay 430 of Fig. 52. Relay 430 operates and by its contact 432 applies a battery current through rest contact of relay 433 to cam 434 and to cam 436 by wire 435. Cam 434 controls the motor magnet of the variable escapement mechanism 436 and cam 436 the selective stop pins of this variable escapement mechanism through the justifier switches. In the example shown by brush 408, terminal 4, brush 417, cam 436 is connected to control magnet 438, No. 2, and prepares the variable escapement for a two unit displacement, this escapement will however operate only when cams 436 and 434 have closed their contacts during the photographic cycle. Instead of photographing a character the film carriage moves the number of additional steps necessary for justification. The operation of cam 436 overlaps that of cam 434 to avoid any false operation.

On the other hand relay 430 has also applied a battery current to cam 440 which closes its contacts during the stepping cycle and applies a battery current to the magnet 439 of switch 414. When the cam opens its contact, magnet 439 falls back and moves brushes 415, 416, 417 and 418 one step. These brushes prepare a circuit for the next interword. Meanwhile during the stepping cycle the film carriage has moved by the number of units allocated to a normal interword, determined by the translator chain of relays of Fig. 46.

It is to be noted that during these two cycles two successive displacements of the film carriage have taken place, first the additional displacement for the justification replacing the photographic cycle, second the normal displacement of an interword. It is clear that no displacement takes place in the first cycle when there are no additional spacings to distribute, either because the line has exactly the length of the justification or because the remainder has been previously completely exhausted. In this case the brushes of the justifier switch selected are on terminals 0 (Fig. 51). All terminals 0 of the row associated with brushes 411, 416, 421 are connected by wire 437 to relay 433, so that, as soon as brushes 411, 416, 421 (when they are connected to a battery) reach one of these terminals 0 relay 433 operates and opens its contact, wire 435 is no longer connected to the battery and no further additional displacement of the film carriage takes place.

*Line counter*

As explained previously under the heading "Justification," brushes 402 and 403 of the selector 401 stop when a line has been typed on the typewriter on a position depending on the number of length units D of which the line is too short.

The purpose of the line counter which is now to be described is to determine this remainder D.

The line counter shown in the drawings, Figs. 54, 55, 56, comprises mainly the selector switch 441 (shown in 401 in Fig. 52), the reversing mechanism 442, the spring motor 443 and the variable escapement mechanism 444. This latter may be of the type previously described under the heading "Variable escapement mechanism" and will not be described in detail here. This escapement controls the extent of displacement of the brushes of the selector, clockwise or counterclockwise as viewed in Fig. 52 according to the position of the reversing mechanism. In the embodiment illustrated the selector 441 comprises two brushes 445 and 446, composed each of two halves staggered so that they scan terminal rows 447 and 448 comprising each 25 terminals. In one revolution the result is the same as if a single brush had scanned 50 terminals.

These brushes are mounted on an insulating sleeve 450 keyed on shaft 451. A spur wheel 452, having as many teeth as there are terminals in one complete circular row of the selector (50 in this example) is pinned on shaft 451 so that a lock can engage the wheel and center it exactly in a position in which the brushes rest on the center part of one terminal. A dial 454 is attached to wheel 452 and enables the operator to read, opposite a fixed index, for instance neutral terminal 455, the number of points or length units separating the brushes from the neutral position. These points are counted clockwise in Fig. 53. A clock wheel 456 is also attached to shaft 451 for controlling another device (not shown) for counting the number of complete revolutions made by the brushes during the composition of a line. The reversing mechanism 442, comprises the driven wheel 457 keyed on shaft 451 and the driving wheel 458 keyed on shaft 459. These wheels are normally engaged by pinion 460 which drives wheel 457 in the same direction as the driving wheel 458, for rotating the brushes of the counter in the normal direction.

Pinion 460 is pinned on a movable casing 461 which slides between guides 462, 475, 476, 477, fixed on brackets 463 secured to base 449 and move upwards to free pinion 460 from wheels 457 and 458 and engage with these wheels pinions 464 and 465. Pinion 464 meshes with wheel 457, its teeth extending nearly across the gap between wheels 457 and 458. Pinion 465 meshes in a similar manner with wheel 458 and at the center the two pinions mesh together. It is clear that when these pinions are engaged with the wheels—that is to say, when electromagnet 466 is energized—wheel 458 rotating in a clockwise direction will drive pinion 465 in a counterclockwise direction, and finally wheel 457 in a counterclockwise direction. The movement of the latter wheel is the reverse of that of the driving wheel 458.

In normal operation, the casing 461 is maintained in its upper position against a stop 467 by a spring 468 so that the wheel 457 and consequently the brushes are driven clockwise as viewed on Fig. 53. The casing 461 is supported by lever 469, pivoted on pin 470 engaged in fork 471 fixed in the casing, said lever being also pivoted on one end of lever 472, the other end of which is pivoted on a fixed pivot 473. A fork 474, on which both levers are pivoted, may be displaced to the right, as seen in Fig. 54 when solenoid 466 is energized. The latter is controlled by the "correction" key of the machine and remains energized throughout the correcting operations, to maintain the casing 461 in its lower position in which pinions 464 and 465 mesh with the wheels to rotate the brushes of the selector counterclockwise, that is to say in the direction of subtraction.

Shaft 459 is constantly urged in one direction by a clock spring 443, one end of the latter is attached to the shaft and the other end to the casing 478 capable of rotating freely on shaft 458 and provided with a toothed ring 479 cooperating with a worm gear 480 mounted on a shaft 481 controlled by a mechanism adapted to rewind it periodically (not shown). The rotation of shaft 459 is controlled by the variable escapement mechanism 444 which, when actuated, allows shaft 459 to rotate 1, 2, 3 . . . 8 points. The length of one point is such that, when the shaft 476 moves one step, the brush rotates through the angle separating two consecutive terminals of the selector, so that the brushes move 1, 2 . . . 8 steps according to the stop member of the variable escapement mechanism which has been energized by a solenoid such as 482, 483 or 484.

As explained previously, before a line is typed, the brushes are set on the terminals corresponding to the desired justification. This terminal, in the example described, will be separated from the neutral terminal 455 by a number of steps equal to the remainder obtained by dividing by 50 the justification desired measured in points.

Assuming, for example, that Fig. 55 represents the position of the brushes at the starting of a line, this position corresponds to several justifications given by Equation 14 ($n \times 50$), since the brushes have to move 14 steps to reach neutral terminal 455.

If Fig. 55 represents the position reached by the brushes after the typing of a line, it means that the typed line is 14 points short. The number of complete revolutions the brushes have made to count the length of the line is immaterial as far as the justification is concerned.

If a character has to be erased after the line has been typed, the counter is displaced in counterclockwise direction as viewed in Fig. 53 a number of points corresponding to the width of the erroneous character as will be explained in detail under the heading "Corrections." The reversal of direction is obtained by energizing a solenoid 466 controlled by the correction key.

In order to avoid shocks and jerks brushes 445—446 are preferably driven by a resilient coupling (not shown) placed between the clock spring and the selector. This resilient coupling makes it possible to increase the speed of operation by enabling the variable escapement mechanism and the driving shaft connected thereto to be set in advance of the brushes, the speed is therefore not limited by the length of time necessary to move these brushes by the number of units corresponding to the widest characters.

In order to center the brushes exactly after the line has been typed a solenoid 485 may be used and energized to push forward a locking pin 453 engaging with wheel 452. The solenoid 485 may be energized either directly by the return carriage or by a relay controlled by a key.

Corrections

The correction device will be described in relation to Figs. 54, 55, 56 and 57. As explained previously the brushes of the line counter shown in Figs. 52, 53 and 54 may be rotated selectively in the normal counting direction shown by the arrow or in the reverse or subtracting direction. Fig. 55 shows a part of the mobile assembly 98 of the register comprising the feelers 104 pivoted on pins 142 supported by plate 139 provided with button holes enabling it to move upwards on its guiding shafts 135 and 147. These shafts support also plate 148 which can be moved toward the left to bring all the pins to their initial positions by means of hooks 103 as has been explained in detail in relation with Figs. 16 to 21.

When the operator notices an error, for example if he has typed letter "w" instead of an "i" he displaces the platen of the typewriter so as to bring the faulty character in printing position exactly as an ordinary typist would do. This brings the register hammers, feelers 104 and erasers 103 opposite the rows of pins where the faulty character has been registered. He then depresses key 509. This key first connects a battery to electromagnet 466 of the unit counter to actuate the reversing mechanism of said counter and to electromagnet 486 through contact 487.

The electromagnet 486 rocks bell crank lever 488 which pushes upwards plate 139 and feelers 104 pivotally fixed to this plate. All the feelers finding an idle pin on their path (that is to say, not displaced to the right in Fig. 55) will be rocked clockwise and subsequently open their associated contacts. These contacts are shown in 489, 490 . . . 495, each of them is provided with two leaf spring contacts, one of which is grounded and the others connected to the following circuit: contact 489, relay 496, contact 490 to relay 497, . . . and contact 495 to relay 502. In the example shown, the character to be erased is represented in the register by the actuated pins 503, 504 and 505, consequently when plate 139 is moved upwards, these pins will not open their associated contacts, 491, 493 and 494. The chain of relays 496, . . . 502 is similar to the chain of relays described under the heading "Selective advance translator of the film carriage" shown in Fig. 44. The operation of a given combination of this chain of relays has for result the selection of one stop pin of the variable escapement 444 (Fig. 55). In the example shown relays 498, 500 and 501 will be operated through contacts 491, 492 and 494 and a battery current applied to the electromagnet controlling an escapement of six teeth of the variable escapement mechanism 444 in the case of the drawing. The escapement 444 operates as soon as the bottom contact of key 509 is closed and connects a battery to the motor electromagnet 506. The brushes of the line counter will move six steps backwards to subtract the width of the faulty character. A relay 507 is provided between key 509 and the motor magnet 506 to give a certain delay between the operation of the motor magnet of the variable escapement 444 and the erasing magnet 508 which pulls plates 148 to the left and brings by means of the erasers 103 the operated pins back to rest position, in the example shown pins 503, 504 and 505.

The erroneous character has thus been erased and its width subtracted from the length of the line. The operator then types the correct letter.

*Visual control of the type of characters*

As it has been previously explained, the font of the characters is changed by a code combination recorded in the register. At the decoding stage, a ground is applied to one of the control wires 510 (Fig. 24). The font may be changed in the middle of a line by depressing a key. It is of interest, in order to avoid any possible mistake, that the operator be informed at any moment of the font and size of the characters he is using, especially when different types of characters are mixed in the same line. In the arrangement shown in Fig. 58, the color of the typewriter ribbon is automatically changed when the operator changes from Roman to italics or bold types. This device may also be used to show which fount is being used, for instance Garamond, Didot or Cheltenham.

On Fig. 58, the keys used to that purpose are shown in 511—516. These keys cooperate with the register and record the code combination which has been allocated to them. The corresponding contacts are however not shown on the drawing for the sake of simplicity.

These keys are provided with a device not shown, so that only one key can be operated at a time.

Keys 513, 511, 512 (Fig. 58) are used for Roman, bold and italics of "Didot" font; keys 516, 514, 515, for Roman, bold and italics "Cheltenham" for instance. In 516 is shown an indicator panel on which the operator may check what type of characters he is using. The typewriter ribbon is shown in 517 and is provided with three different colors, black on top, red in the middle, and violet below. It is held in place by member 518 sliding in member 519 under the control of a lever 520 rocking about axis 521 and provided with a fork engaging the lever member 518. This lever is constantly pulled in one direction by spring 523 and may assume three different positions by means of three electromagnets 524, 525, 526, which have different strokes, supplying to the end of lever 520 three different rest positions. When, for instance, key 512 "Didot bold" is actuated, a battery current is applied to electromagnet 525 which pulls its plunger and lifts lever 520 in its intermediate position. The ribbon 517 is therefore pulled down and presents its red portion opposite to the type bars of the typewriter. Key 511 remains in operated position and lights a lamp behind the upper middle window of indicator panel 522.

*Control of the master character drum*

As it has been explained, the matrix characters are preferably arranged on a sheet such as 53 placed round a transparent drum 30 (Fig. 4) so that several rows of characters of different fonts are on the same drum. In order to displace automatically drum 30 during the photographic printing of a line in order to have several different fonts of characters in the same line, for instance Roman, italic and bold, it is necessary to provide a mechanism controlled by the register to slide the drum carriage 40 and lock it in the selected position. Such a device is shown in Figs. 59 and 60. The carriage 40 slides on base 527. A series of combs 528 cooperate with a series of stops 529 to stop the carriage in a predetermined position. Stop levers 529 are pivoted in 530 and maintained clear of stop 531 attached to the carriage by springs 532, but may be rocked counterclockwise, as seen in Fig. 59 by solenoid 533. Carriage 40 is constantly urged by a spring 534 in the direction of arrow F, and a motor 535 may act on the carriage to pull it in the other direction against the action of spring 534. A series of insulated brushes 536—540, in the same number as the different positions the carriage may assume, are secured to base 527. Each solenoid 533 may be controlled by a combination of the register, so that the selected solenoid will be energized during the two cycles of the machine and the drum will move during these two cycles to bring a new row of characters opposite the photographic lens. The operation of the device will be better understood with reference to Fig. 60. The carriage is schematically shown and may slide between rollers 541.

The brushes 536—540 make contact either with plates 542 or 543. Plate 542 is conductive while plate 543 is not. Plate 542 is permanently connected to one terminal of the winding of motor 535 by means of brush 544 and the other terminal of this electromagnet is connected to a battery. Each brush 536—540 is connected on the one hand to one of the wires 510 of decoding relays (Fig. 24) and, on the other hand, to the windings of electromagnets 545—550. The other terminals of these electromagnets are connected to a battery. Each of these electromagnets is provided with a plunger 551 (see lower part of Fig. 50) with a groove cooperating with a plate 552, which is pressed against the plungers by a spring 553. Plate 552 holds in the operated position any plunger that has been momentarily energized, such as plunger 547. The diameter of the plungers is such that when another plunger is operated it will disengage the plunger held in operated position by plate 552. In this way, there may be only one plunger in operated position at a time. These plungers close, when they are in operated position, contacts 555—556, which are on one side connected to a battery, and on the other side to electromagnets 533, by wires 554 (see Fig. 59).

The arrangement is such that when an electromagnet, such as 545 is operated, carriage 40 will move either in the direction of arrow F or in the opposite direction depending on which of the electromagnets was previously in operated position. If, for example, the code combination corresponding to hold types is such that a ground is applied by decoding relays (Fig. 24) on wire 557 (Fig. 60) this ground will cause plunger 547 to be energized, close contact 555 and liberate plunger 547 which opens its associated contact. Contact 555 applies a battery current to electromagnet 533 and this electromagnet rocks stop lever 529 which moves on the path of member 531. On the other hand, wire 537 also applies a ground to brush 536, and therefore to the plate 542 and motor 535.

The last motor will be energized as long as contact 536—542 remains closed. Motor 535 pulls the carriage in the direction opposite to arrow F and, due to inertia, this pull lasts a little time after brush 536 has ceased to make contact with plate 542 and spring 534 will finally bring carriage 40 into contact with stop 529 in the direction of arrow F. Member 531 is provided with a cam surface 559 so that it may move in the direction opposite of the arrow, even if it meets a stop lever. If instead of applying a ground on wire 557, this ground is applied on wire 560, plunger 561 liberates plunger 547 from locking plate 552 and closes its contact 558 and the corresponding stop lever rocks and moves in the path of member 531; on the other hand, a ground is applied on brush 540, but remains unoperative, since this brush is, as shown in the drawing, in contact with the insulating plate and the carriage moves in the direction of arrow F under the action of spring 534 until member 531 has met the operated stop lever. As may be seen on the drawing, when the carriage is at rest, in any of its different positions, the brush corresponding to this position is not in contact with conductive plate 197. The stop positions of carriage 16 may be determined with a high degree of precision since it is always spring 527 that brings the carriage into operating position and the stop position is independent of play which may be present in the mechanism.

The device which has been just described may also be used to control the displacement of other members of the machine, for example, the lens turret and the set of gears associated with the film carriage.

*Carriage return mechanism*

As explained above, a line of text is registered on the register while the combinations of pins, representing the line previously registered, is scanned by the scanning carriage, translated by the translator, and photographed. The sequence at which characters are photographed is adjusted at such a value that a line is photographed more quickly than it is typed, registered and checked for errors, this feature resulting in that, for lines of equal length, the machine will always be slightly in advance on the operator.

At the end of a line, and before starting the typing of the following line, the operation of the different parts of the machine will be as follows:

1. Stopping of the film carriage and scanning carriage.
2. Return of the film carriage to a point beyond its normal position at the beginning of a fresh line.
3. Advance step by step of this carriage to its normal position, insuring the vertical alignment of the left margin of a page.
4. Rotation of the film sprockets to insure line spacing.
5. Return of the scanning carriage of the register.
6. Registering of the "end of line" signal.
7. Displacement of the register frame bearing the mobile parts to place the hammer opposite fresh rows.
8. Rotation step-by-step of the justifier brushes.
9. Energization of homing circuit of line counter.
10. Energization of homing circuit of the interwords counter.
11. Return of the typewriter platen.

The operations 1 to 5 inclusive are performed automatically when the line is entirely photographed, through a control relay 562 which is energized by the "end of line" signal of the register.

The operation of the carriage return and associated circuits will be more easily understood with reference to Fig. 61, where an embodiment of this feature is schematically shown. The light film carriage 303 with its rollers travels on bars 308 in the direction of arrow F to space characters as previously stated. This carriage is returned against the action of spring 330, upon energization of magnet controlled clutch 563, the driving part of which is continuously rotated by a flexible link 564, connected to a worm gear 565 cooperating with gear 566. Upon energization of clutch 563, drum 567 is rotated and cord 568 is wound up, returning the carriage backwards. A second clutch 569 when energized rotates square shaft 322 a given angle to feed film for line spacing. A third clutch 570 is also provided to return the scanning carriage of the register.

The displacements of the film carriage, during the photographic printing, are controlled by a variable escapement, not shown on Fig. 61, pinned on shaft 571, to let the carriage escape a selected number of teeth to ensure proper character spacing, said carriage being provided with a rack 331 cooperating with a gear 572. A very light wheel 573, such as a clockwork wheel having a relatively large number of teeth, is keyed to control shaft 571, and bears a conducting ring 574 provided with an insulated point 575. Two brushes 576 and 577 cooperate with said ring, the brush 577 being electrically disconnected from brush 576 when it comes to rest on the insulated point 575. The wheel 573 meshes with a small pinion 578 provided with a speed-limiting device such as an air brake consisting of a rotating blade 579.

As explained above, when the register pins representing the "end of line" signal are contacted by the feelers of the scanning carriage, the return film carriage relay 562 is energized through wire 580. Energization of this relay breaks the circuit of cams 385 and 592 controlling normally the advance of the film carriage and the scanning carriage and closes two contacts as clearly shown in the drawing, the left hand contact providing a circuit for maintaining the relay energized as long as this circuit is not cut off by the depression of the carriage return key 426, and the right hand contact closing a supply circuit to actuate simultaneously the three clutches 563, 569 and 570 to return the film carriage, feed the film for line spacing and return the scanning carriage of the register. The film carriage 303 is returned until an insulated stud 583 mounted on said carriage actuates an overchange contact 584 to cut off the supply to clutch 563 as shown. Owing to inertia, the carriage continues its travel a little distance beyond the point where contact 585 is open and contact 586 closed. This latter contact establishes a circuit by connecting terminal + of a grounded battery to brush 577 and the electromagnets 587 and 588. The magnet 587 controls the sliding stop, permitting the variable escapement associated with the film carriage to advance one tooth or point, and the electromagnet 588 unlocks the carriage return key 426 upon energization. The electromagnet 386 controlling the advance of the film carriage breaks, when actuated, a contact 582 which is restored when electromagnet 386 returns to rest position, so that, when said electromagnet will be energized through contact 586, the brush 577, the ring 574, the brush 576 and the contact 582, it will be energized and de-energized in rapid successions, each time permitting the variable escapement to escape one tooth which results in advancing the film carriage one point and rotating wheel 573 a certain angle. When this wheel reaches the position corresponding to the starting position of the film carriage, the supply circuit to the magnet 386 is opened, the insulated point 575 arriving under the brush 576.

The locking magnet 588 insures that the typewriter platen will not be returned before the line previously typed is entirely photographed. When this locking magnet is energized, the return key 426 can be depressed by the operator. When depressed, this key opens its upper contacts 581 cutting off the maintenance circuit of the relay 562, which is de-energized and closes the lower contacts to energize the electromagnet 589 to set into operative position on the register, the combination of the end of the line signal. The lower contacts provide also an energizing circuit for relay 590 which is sufficiently retarded when de-energized to permit the setting of the justifier device.

*Timing diagram*

Fig. 62 shows the timing of the various cams for two consecutive cycles. The "photographic" cycle is divided into sixteen intervals or points numbered 1 to 16 and the "stepping" cycle also into sixteen points numbered 17 to 32. As it has been explained before, only one character is photographed during these two consecutive cycles.

The cam 243 opens the control circuit of the flashing unit during the stepping cycle. Its associated contact is closed between points 0 and 16.

The cam 591 controls the escapement driving the heavy film carriage through a resilient coupling, and is actuated as many times as necessary during each cycle to convert the intermittent motion of the escapement into a continuous drive.

The cam 384 controls the sliding stops of the variable escapement mechanism of the film carriage to space characters and establishes a contact between points 13 to 23.

The cam 385 controls the actuation of the variable escapement mechanism associated with the film carriage for character spacing and closes a contact between points 15 and 21.

The cam 592 controls the step by step movements of the scanning carriage of the register. It closes a contact between points 21 and 27.

The cam 436 controls the sliding stops of the variable escapement mechanism associated with variable extend between words for justification purposes.

The cam 434 controls the actuation of the variable escapement mechanism associated with the film carriage for justification purposes when words must be spaced a supplementary number of points.

The cam 593 controls the erasing hammer of the register and closes a contact between points 1 and 11.

The cam 440 advances one step the justifier each time the film carriage advances for an interword. It closes a contact between points 17 and 22.

The upper line of the graph of Fig. 62 shows schematically the impulses produced on the photocell at each passage of characters these impulses being preferably not produced between points 31—1 and 16—17.

Having thus disclosed our invention what we claim as new and desire to secure by Letters Patent:

1. In photographic type composing apparatus, the combination of a character carrier bearing the characters to be photographed and corresponding impulse generating means, each in precise spatial relation to a particular character, a continuously rotating mechanism for moving the characters successively relative to a fixed projection position while moving each of the generating means successively over a single path relative to a fixed control position, whereby each character is precisely aligned in the projection position when its corresponding generating means is precisely aligned in the control position, an intermittent flash device in position to illuminate a character in the projection position, optical means to project an illuminated character upon a sensitive material, a responsive device in position for receiving an impulse from each and every generating means at the precise instant when each of said generating means reaches the control position, selector means for determining a character to be projected, a circuit from an energizing source to the flash device, and a gating device connected to the responsive device to activate said circuit by means of an impulse, said gating device including means operated in exact synchronism with the character carrier and controlled by the selector means to cause the impulse from the generating means corresponding to the selected character to activate said circuit.

2. Apparatus according to claim 1 in which the selector means includes a register for storing information corresponding to a line of characters and interword spaces of written matter and reading means controlled by the register for determining a character to be projected.

3. Apparatus according to claim 1 in which the impulse generating means are light-control areas and the responsive device is a single photoelectric detecting device in position to receive that portion of the light from a source which is admitted through the control areas.

4. Photographic composing apparatus comprising a manual keyboard and means for displaying characters of written matter, a register for storing information corresponding to a line of characters and interword spaces of said written matter, a character carrier comprising a rigid continuously rotatable member on which characters of different widths are displayed at uniform distances from the axis of rotation, means for supporting a sensitized sheet having provision for advancing the sheet for line spacing, projection apparatus for projecting characters from said character carrier on to the sensitized sheet, a movable carriage to cause the characters to be projected to successive portions of the sheet, an impulse generator including a stationary responsive device and having means on the character carrier in fixed spatial relation to each character, said responsive device being activated to generate an impulse for each and every character at a precise instant when the corresponding character is in projection position, an intermittent discharge tube having a discharge time which is short in comparison with the time of passage of a character past the projection apparatus, a rough control device operable for each character through approximately the interval of passage of the character past the projection apparatus, a discharge control circuit for the tube, means for energizing the discharge control circuit only under the joint action of the register, the rough control device, and the impulse generator, and mechanism controlled by the register for variably moving the carriage in accordance with the character and interword widths.

5. Apparatus according to claim 4 in which the impulse generator comprises light-control areas on the character carrier, one for each character and each in precise spatial relation to a particular character, and the responsive device includes a single photoelectric cell.

6. Apparatus according to claim 5 in which the character carrier is a disk around which the characters and light-control areas are arranged in concentric circles.

References Cited in the file of this patent

UNITED STATES PATENTS

| | | |
|---|---|---|
| 581,815 | Eaton | May 4, 1897 |
| 582,157 | Eaton | May 4, 1897 |
| 829,263 | Franke | Aug. 21, 1906 |
| 1,317,406 | Siemens | Sept. 30, 1919 |
| 1,457,853 | O'Bryan et al. | June 5, 1923 |
| 1,540,741 | Hunter et al. | June 2, 1925 |
| 1,647,408 | Hunter | Nov. 1, 1927 |
| 1,723,784 | Hunter et al. | Aug. 6, 1929 |
| 1,732,049 | Hunter | Oct. 15, 1929 |
| 1,815,693 | Madaler | July 21, 1931 |
| 1,837,704 | Dean | Dec. 22, 1931 |
| 1,929,105 | Sperbeck | Oct. 3, 1933 |
| 1,933,650 | Bascom | Nov. 7, 1933 |
| 2,073,637 | Hoorn | Mar. 16, 1937 |
| 2,107,039 | Leventhal et al. | Feb. 1, 1938 |
| 2,108,767 | Fitz Gerald | Feb. 15, 1938 |
| 2,168,886 | Roberts | Aug. 8, 1939 |
| 2,178,989 | Conrad | Nov. 7, 1939 |
| 2,186,013 | Edgerton | Jan. 9, 1940 |
| 2,202,458 | Levy | May 28, 1940 |
| 2,203,437 | Levy | June 4, 1940 |

(Other references on following page)

UNITED STATES PATENTS

| | | |
|---|---|---|
| 2,240,938 | McNaney | May 6, 1941 |
| 2,264,615 | Bryce | Dec. 2, 1941 |
| 2,269,161 | Morse | Jan. 6, 1942 |
| 2,280,096 | Morrison | Apr. 21, 1942 |
| 2,283,383 | McNaney | May 19, 1942 |
| 2,296,048 | Planskoy | Sept. 15, 1942 |
| 2,298,666 | Whitelaw | Oct. 13, 1942 |
| 2,320,337 | Bryce | June 1, 1943 |
| 2,321,697 | Moulin | June 15, 1943 |
| 2,338,489 | Campbell | Jan. 4, 1944 |
| 2,346,251 | Bryce | Apr. 11, 1944 |
| 2,346,983 | Mayer et al. | Apr. 18, 1944 |
| 2,349,687 | Williams | May 23, 1944 |
| 2,354,768 | Nokes | Aug. 1, 1944 |
| 2,356,620 | Schade | Aug. 22, 1944 |
| 2,369,431 | Bryce | Feb. 13, 1945 |
| 2,377,801 | Mills et al. | June 5, 1945 |
| 2,378,371 | Tholstrup | June 12, 1945 |
| 2,379,880 | Burgess | July 10, 1945 |
| 2,393,316 | Edgerton | Jan. 22, 1946 |
| 2,398,238 | McNatt | Apr. 9, 1946 |
| 2,408,754 | Bush | Oct. 8, 1946 |
| 2,415,390 | Konkle | Feb. 4, 1947 |
| 2,432,527 | Lang | Dec. 16, 1947 |
| 2,438,588 | Tolson | Mar. 30, 1948 |
| 2,440,797 | Clough | May 4, 1948 |
| 2,441,899 | Ogden | May 18, 1948 |
| 2,475,497 | Harrold et al. | July 5, 1949 |
| 2,486,834 | Freund | Nov. 1, 1949 |